US009286217B2

(12) United States Patent
Xu et al.

(10) Patent No.: US 9,286,217 B2
(45) Date of Patent: Mar. 15, 2016

(54) SYSTEMS AND METHODS FOR MEMORY UTILIZATION FOR OBJECT DETECTION

(71) Applicant: QUALCOMM Incorporated, San Diego, CA (US)

(72) Inventors: Lei Xu, San Diego, CA (US); Bo Zhou, San Diego, CA (US); Michael Warren Castelloe, San Diego, CA (US); Shuxue Quan, San Diego, CA (US); Xinping Zhang, San Diego, CA (US); Junchen Du, San Diego, CA (US); Ashwath Harthattu, San Diego, CA (US); Feng Guo, San Diego, CA (US); Yingyong Qi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 78 days.

(21) Appl. No.: 14/468,208

(22) Filed: Aug. 25, 2014

(65) Prior Publication Data

US 2015/0058579 A1    Feb. 26, 2015

Related U.S. Application Data

(60) Provisional application No. 61/870,186, filed on Aug. 26, 2013, provisional application No. 61/870,180, filed on Aug. 26, 2013, provisional application No. 61/870,185, filed on Aug. 26, 2013.

(51) Int. Cl.
*G06F 12/08*     (2006.01)
*G06K 9/00*      (2006.01)

(52) U.S. Cl.
CPC ........ *G06F 12/0802* (2013.01); *G06K 9/00973* (2013.01); *G06F 2212/60* (2013.01)

(58) Field of Classification Search
CPC ................. G06F 12/0802; G06K 9/00973
USPC .......... 711/141, 156, 158, 170; 345/537, 543, 345/565, 581, 628, 660; 383/226, 291
See application file for complete search history.

(56) References Cited

U.S. PATENT DOCUMENTS

| 5,995,915 | A | 11/1999 | Reed et al. |
| 7,246,102 | B2 * | 7/2007 | McDaniel ............... G06N 5/02 370/351 |
| 8,078,642 | B1 | 12/2011 | Poutanen |

(Continued)

OTHER PUBLICATIONS

Chilimbi T M., "Cache-conscious Data Structures—Design and Implementation", XP55157817, Retrieved from the Internet: URL:http://ftp.cs.wisc.edu/wwt/theses/chilimbi.ps, Jan. 1, 1999, 132 pages.

(Continued)

*Primary Examiner* — Stephen Elmore
(74) *Attorney, Agent, or Firm* — Austin Rapp & Hardman

(57) ABSTRACT

A method for memory utilization by an electronic device is described. The method includes transferring a first portion of a first decision tree and a second portion of a second decision tree from a first memory to a cache memory. The first portion and second portion of each decision tree are stored contiguously in the first memory. The first decision tree and second decision tree are each associated with a different feature of an object detection algorithm. The method also includes reducing cache misses by traversing the first portion of the first decision tree and the second portion of the second decision tree in the cache memory based on an order of execution of the object detection algorithm.

30 Claims, 20 Drawing Sheets

(56) References Cited

U.S. PATENT DOCUMENTS

| | | | | |
|---|---|---|---|---|
| 8,472,728 | B1* | 6/2013 | Chau | G06K 9/00684 382/159 |
| 8,934,488 | B2* | 1/2015 | Goyal | G06N 5/02 370/392 |
| 8,937,952 | B2* | 1/2015 | Goyal | G06N 5/02 370/392 |
| 8,937,954 | B2* | 1/2015 | Goyal | G06N 5/02 370/392 |
| 2005/0235287 | A1 | 10/2005 | Harper | |
| 2011/0126158 | A1* | 5/2011 | Fogarty | G06F 3/0481 715/835 |
| 2013/0179377 | A1 | 7/2013 | Oberg et al. | |
| 2013/0195361 | A1 | 8/2013 | Deng et al. | |
| 2015/0002392 | A1* | 1/2015 | Kempinski | G06T 7/204 345/156 |
| 2015/0036942 | A1* | 2/2015 | Smirnov | G06K 9/6282 382/227 |
| 2015/0128075 | A1* | 5/2015 | Kempinski | G06F 3/012 715/765 |
| 2015/0149956 | A1* | 5/2015 | Kempinski | G06F 3/017 715/784 |

OTHER PUBLICATIONS

Hashemi A H., et al., "Efficient Procedure Mapping Using Cache Line Coloring", Principles of Programming Languages, ACM, 2 Penn Plaza, Suite 701 New York NY 10121-0701 USA, vol. 32, No. 5, XP000655924, ISSN: 0362-1340, DOI: 10.1145/258916.258931 ISBN: 978-1-4503-1832-7 Sections 1 and 2.2.1, May 1, 1997, pp. 171-182.

International Search Report and Written Opinion—PCT/US2014/052689—ISA/EPO—Dec. 22, 2014, pp. 1-11.

Lai B-C C., et al., "Classifier Grouping to Enhance Data Locality for a Multi-threaded Object Detection Algorithm", Parallel and Distributed Systems (ICPADS), 2011 IEEE 17th International Conference on, IEEE, XP032087286, DOI: 10.1109/ICPADS.2011.43, ISBN: 978-1-4577-1875-5, Sections V and VI, Dec. 7, 2011, pp. 268-275.

Markus N., et al., "A method for object detection based on pixel intensity comparisons", XP55157818, Retrieved from the Internet: URL:http://arxiv.org/pdf/1305.4537v1.pdf, May 20, 2013, 1-5 pages.

"The OpenCV User Guide 2.4.5.0", XP55157814, Retrieved from the Internet: URL:https://web.archive.org/web/20130502071449/http://docs.opencv.org/opencv_user.pdf, Apr. 5, 2013, 22 pages.

Huang D., et al., "Local Binary Patterns and Its Application to Facial Image Analysis: A Surve," IEEE Transactions on Systems, Man, and Cybernetics: Part C: Applications and Reviews, IEEE Service Center, Piscataway, NJ, US, vol. 41, No. 6, Nov. 1, 2011, pp. 765-781, XP011363204, ISSN: 1094-6977, DOI: 10.1109/TSMCC.2011.2118750 abstract sections I, III, V, VI.

Viola P. et al., "Robust Real-time Object Detection," In the Second International Workshop on Statistical and Computational Theories of Vision—Modeling, Learning, Computing, and Sampling, Vancouver, Canada, Jul. 13, 2001, 25 pages.

Wayback Machine: "2-Way Set Associative—Cache 64 bytes", Retrieved on Aug. 25, 2014, pages 1, URL: http://web.archive.org/web/20140216120831/http://comsci.us/co/notes/images/cache2.gif.

Wayback Machine: "Set Associative Caches—Computer Science Now", Retrieved on Aug. 25, 2014, pp. 3, URL: http://web.archive.org/web/20140214123517/http://comsci.us/co/notes/cachesa.html.

Wikipedia: "File:Write-Back With Write-Allocation.Svg"—From Wikipedia, the free encyclopedia, Retrieved on Aug. 25, 2014, pp. 3, URL: http://en.wikipedia.org/wiki/File:Write-back_with_write-allocation.svg.

\* cited by examiner

SYSTEMS AND METHODS FOR MEMORY UTILIZATION FOR OBJECT DETECTION

RELATED APPLICATIONS

This application is related to and claims priority to U.S. Provisional Patent Application Ser. No. 61/870,186 filed Aug. 26, 2013, for "ACCELERATION OF SLIDING-WINDOW OBJECT DETECTION," U.S. Provisional Patent Application Ser. No. 61/870,180 filed Aug. 26, 2013, for "CACHE OPTIMIZATION AND REDUCING MEMORY USAGE OF LBP-LIKE FEATURES" and U.S. Provisional Patent Application Ser. No. 61/870,185 filed Aug. 26, 2013, for "EFFICIENT COMPUTATION OF RECTANGLE VALUES ON INTEGRAL IMAGE."

TECHNICAL FIELD

The present disclosure relates generally to electronic devices. More specifically, the present disclosure relates to systems and methods for memory utilization for object detection.

BACKGROUND

In the last several decades, the use of electronic devices has become more common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform new functions and/or that perform functions faster, more efficiently or with higher quality are often sought after.

Some electronic devices (e.g., cameras, video camcorders, digital cameras, cellular phones, smart phones, computers, televisions, etc.) capture or utilize images. For example, a digital camera may capture a digital image.

Some applications may be very memory intensive. For example, some applications access memory a large number of times. Performance can be degraded if memory accesses are too high. As can be observed from this discussion, systems and methods that improve memory utilization may be beneficial.

SUMMARY

A method for memory utilization by an electronic device is described. The method includes transferring a first portion of a first decision tree and a second portion of a second decision tree from a first memory to a cache memory. The first portion and second portion of each decision tree are stored contiguously in the first memory. The first decision tree and second decision tree are each associated with a different feature of an object detection algorithm. The method also includes traversing the first portion of the first decision tree and the second portion of the second decision tree in the cache memory based on an order of execution of the object detection algorithm.

Reducing cache misses may result in lower latency for processing the object detection algorithm compared to when the first portion and second portions are not contiguously arranged in the first memory. Reducing cache misses may result in less power consumption for processing the object detection algorithm compared to when the first portion and second portions are not contiguously arranged in the first memory.

The method may include loading frequently grouped portions of decision trees together to fit in a fixed memory size. The method may also include accessing the frequently grouped portions of the decision trees based on the order of execution of the object detection algorithm. A feature in the object detection algorithm may include a local binary pattern (LBP) feature.

The method may include determining a feature based on an integral image. The method may also include determining how the feature will be saved in memory. The method may further include storing the feature in the memory using at least one pointer and a width of a rectangle used in the feature. The feature may be stored in memory using two pointers and the width of the rectangle used in the feature. The feature may be stored in memory using one pointer, the width of each rectangle used in the feature and a height of each rectangle used in the feature. The feature may be stored in memory using four pointers and the width of the rectangle used in the feature. The feature may include a Haar feature.

An electronic device for memory utilization is also described. The electronic device includes a processor and memory in electronic communication with the processor. The electronic device also includes instructions stored in the memory. The instructions are executable by the processor to transfer a first portion of a first decision tree and a second portion of a second decision tree from a first memory to a cache memory. The first portion and second portion of each decision tree are stored contiguously in the first memory. The first decision tree and second decision tree are each associated with a different feature of an object detection algorithm. The instructions are also executable to traverse the first portion of the first decision tree and the second portion of the second decision tree in the cache memory based on an order of execution of the object detection algorithm.

An apparatus for memory utilization is also described. The apparatus includes means for transferring a first portion of a first decision tree and a second portion of a second decision tree from a first memory to a cache memory. The first portion and second portion of each decision tree are stored contiguously in the first memory. The first decision tree and second decision tree are each associated with a different feature of an object detection algorithm. The apparatus also includes means for traversing the first portion of the first decision tree and the second portion of the second decision tree in the cache memory based on an order of execution of the object detection algorithm.

A non-transitory tangible computer-readable medium with instructions is also described. The instructions include code for causing an electronic device to transfer a first portion of a first decision tree and a second portion of a second decision tree from a first memory to a cache memory. The first portion and second portion of each decision tree are stored contiguously in the first memory. The first decision tree and second decision tree are each associated with a different feature of an object detection algorithm. The instructions also include code for causing the electronic device to traverse the first portion of the first decision tree and the second portion of the second decision tree in the cache memory based on an order of execution of the object detection algorithm.

DETAILED DESCRIPTION

Performing frontal face detection may require a substantial amount of processing power. Existing techniques for performing face detection may rely upon robust processing power of a personal computer (PC) or other electronic device. Some methods of performing face detection may be less reliable on a mobile device or require more processing power than is generally available to various electronic devices (e.g., mobile devices, wireless devices, etc.). As a result, accurate or real-time face detection may be difficult or impossible to achieve on less powerful electronic devices using existing methods. Therefore, it may be advantageous to accelerate face detection to enable various electronic devices to perform face detection more efficiently. Although facial detection is described throughout, the object detection systems and methods disclosed herein may be used for detecting other objects besides faces.

Figure 1:
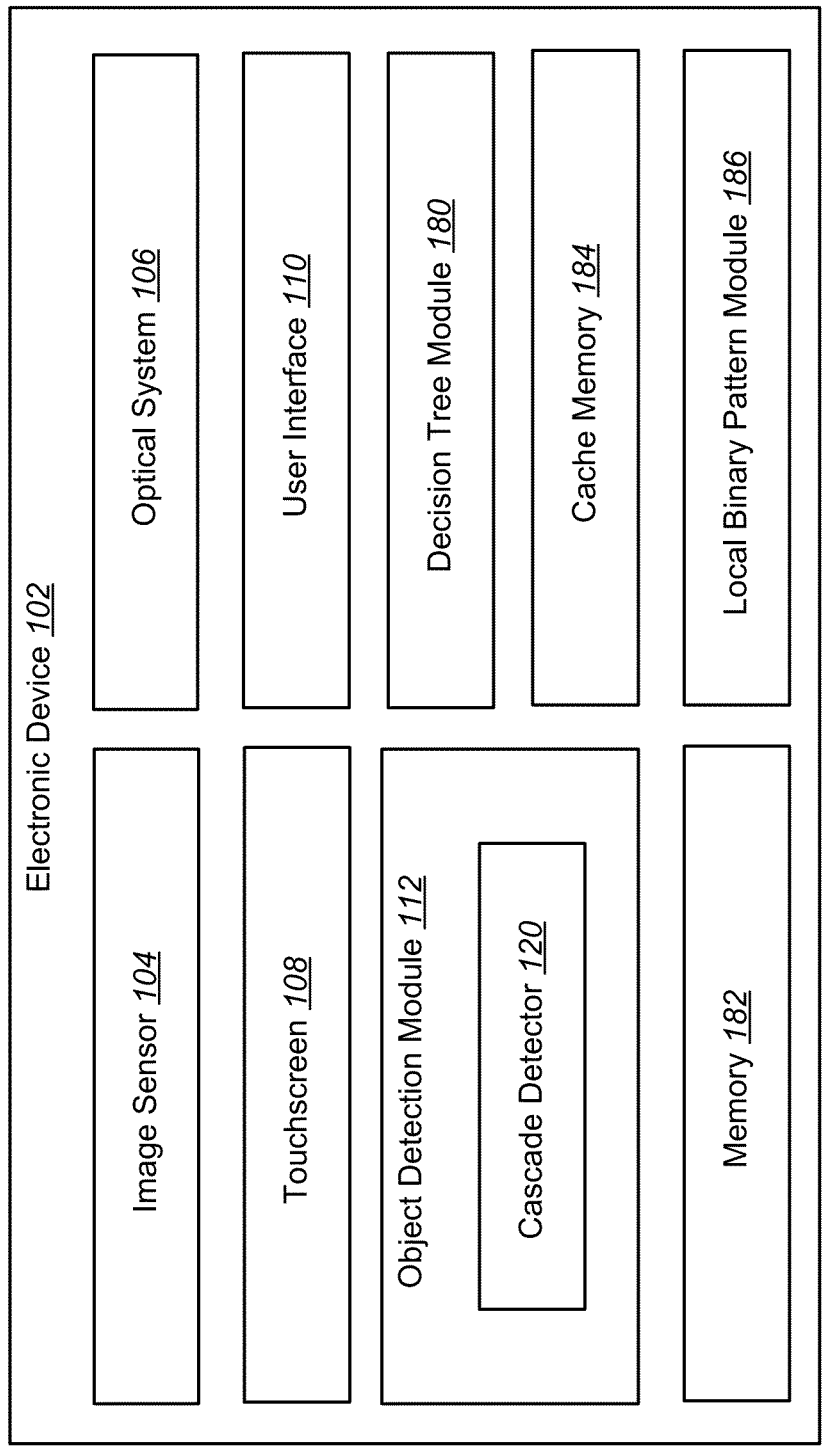
FIG. 1 is a block diagram illustrating an electronic device that may be implemented in accordance with the systems and methods disclosed herein.

FIG. 1 is a block diagram illustrating an electronic device 102 that may be implemented in accordance with the systems and methods disclosed herein. The electronic device 102 may also be referred to as a wireless communication device, a mobile device, mobile station, subscriber station, client, client station, user equipment (UE), remote station, access terminal, mobile terminal, terminal, user terminal, subscriber unit, etc. Examples of electronic devices 102 include laptops or desktop computers, cellular phones, smart phones, wireless modems, e-readers, tablet devices, gaming systems, etc. Some of these devices may operate in accordance with one or more industry standards.

The electronic device 102 may include one or more of an image sensor 104, an optical system 106, a touchscreen 108, a user interface 110, an object detection module 112, a decision tree module 180, cache memory 184, memory 182 and a local binary pattern module 186. It should be noted that one or more of these components may be optional and may not be included in the electronic device 102 in some configurations. Additionally or alternatively, one or more of these components may be coupled to the electronic device 102 (via an external port, for example) and/or may be in communication with the electronic device 102 (via a communication interface, for example).

An electronic device 102, such as a smartphone or tablet computer, may include or be coupled to a camera. The camera may include an image sensor 104 and an optical system 106 (e.g., lenses) that focuses images of objects that are located within the optical system's 106 field of view onto the image sensor 104. An electronic device 102 may also include a camera software application and a display screen. When the camera application is running, images of objects that are located within the optical system's 106 field of view may be captured (e.g., recorded) by the image sensor 104. The images that are being captured by the image sensor 104 may be displayed on the display screen. These images may be displayed in rapid succession at a relatively high frame rate so that, at any given moment in time, the objects that are located within the optical system's 106 field of view are displayed on the display screen. Although the present systems and methods are described in terms of captured video frames, the techniques discussed herein may be used on any digital image. Therefore, the terms video frame and image (e.g., digital image) may be used interchangeably herein.

A user interface 110 of the camera application may permit a user to interact with an object detection module 112 (using a touchscreen 108, for example). The object detection module 112 may include an image scanner (e.g., adaptive step image scanner) and a cascade detector 120 (e.g., early-termination cascade detector 120) that uses a sliding window approach to adaptively select a scanning window (e.g., within a video frame) to analyze. Specifically, the object detection module 112 may determine a scanning window for performing face detection (e.g., determining whether a face is present within the scanning window) on the scanning window. Determining a scanning window may include selecting a next scanning window relative to a previously selected scanning window. Selecting the next window may be based on a classifier confidence value obtained from performing face detection and classifying the previously selected scanning window. The classifier confidence value may provide a likelihood of whether a face is present in an analyzed scanning window.

The classifier confidence value may be used to determine a location of a next scanning window. For example, if a previously selected scanning window is highly unlikely to include a face, it is unlikely that windows very close to the previous window would include a face. Therefore, the image scanner may select a window that is relatively far from the previous window (e.g., a large step size in the x direction, y direction or both). Conversely, if the previous window analyzed likely includes a face (or a portion of a face), nearby windows may also be likely to include at least a portion of the face. Therefore, the image scanner may select a window that is relatively close to the previous window (e.g., a small step size in the x direction, y direction or both). By using an adaptive step size instead of a fixed step size, the image scanner may reduce total processing for face detection with minimal loss of accuracy, e.g., the present systems and methods may use larger steps to avoid processing windows with a low likelihood of including a face or a portion of a face.

In some configurations, the object detection module 112 may determine a classifier confidence value as well as classifying a scanning window. As used herein, "classifying" a scanning window may include determining a status of a scanning window as "face" or "non-face." For example, a scanning window classified as "face" may indicate a high confidence that a face is present within the scanning window. Conversely, a scanning window classified as "non-face" may indicate a low confidence that a face is present within the scanning window. Other classifications may exist to indicate varying levels of confidence regarding the presence of a face in a scanning window. In addition to classifying a scanning window, the cascade detector 120 may determine a specific confidence value to indicate a level of certainty as to whether a face is present in the scanning window.

The cascade detector 120 may further include multiple stage classifiers, each including multiple weak classifiers. Each stage within a stage classifier may be used to determine whether a face is present in the scanning window. Further, each stage and weak classifier may be used to decide whether to analyze (e.g., evaluate) subsequent stages and weak classifiers. In other words, for some scanning windows, less than all of the stages may be executed (e.g., evaluated) before a face/non-face decision for a scanning window is made. Further, some stages may be completed before each of the weak classifiers is examined within each stage. For example, in a stage with k weak classifiers, a first weak classifier may be examined to determine that the scanning window should be classified as a non-face or a face for a particular stage, and that none of the subsequent k−1 weak classifiers within the stage are needed to evaluate the scanning window. This may reduce processing in the cascade detector 120 (compared to executing every weak classifier in a stage before making a face or non-face stage decision). Classifying the scanning windows using stages and weak classifiers is described in additional detail below.

Further, it is noted that various decisions or classifications (e.g., face, non-face, inconclusive, etc.) may be made at various levels within a cascade detector 120. Therefore, as used herein, a window decision or decision regarding a scanning window may refer to a scanning window classification or an output of a cascade detector 120. Further, a stage decision may refer to a stage classification or an output of a stage classifier. Further, a weak classifier decision (or combination of weak classifier decisions) may refer to one or more feature classifications or an output of a weak classifier. Other decisions may also be referred to herein.

In some configurations, the electronic device 102 may include a decision tree module 180, a memory 182, a cache memory 184 and/or a local binary pattern module 186. The memory 182 may be used to store data that is periodically used by the electronic device 102. Examples of the memory 182 may include volatile memory (e.g., Random Access Memory (RAM)), non-volatile memory (e.g., storage, hard drive, hard disk drive, solid-state drive (SSD), flash memory, etc.) and combinations thereof. The memory 182 may be referred to as "external memory" in some cases, meaning that the memory 182 may be external from a processor. It should be noted that the memory 182 may be internal and/or external to the electronic device 102. In some configurations, the memory 182 may be used to store data for a software program that has not been used since the electronic device 102 has been powered on.

The cache memory 184 may be used to store data that the electronic device 102 accesses more often or has more recently been accessed. In some configurations, the cache memory 184 may be a processor (e.g., Digital Signal Processor (DSP)) cache. Storing data in the cache memory 184 may reduce the time needed to retrieve the data since the cache memory 184 may be faster (than the memory 182, for example). Data stored in the cache memory 184 may be relocated to other parts of the cache memory 184 or relocated to the memory 182. If data is requested from the cache memory 184 but the data has been moved from that location, a cache miss may occur. A cache miss occurs when requested data that was previously stored in a location in cache memory 184 has been moved and the request cannot be filled. The requests and responses by the cache memory 184 to the data requests may create bus traffic on the communication routes within the electronic device 102. If there are too many requests and responses happening at the same time, the bus traffic may cause the processing rate of the electronic device 102 to decrease.

In some configurations, a cache (e.g., DSP cache memory 184) may operate as follows. When a memory request (read or write) is made, the electronic device 102 may determine whether there is a cache hit. If there is not a cache hit, a cache block to use may be located. It may be determined whether the cache block is dirty. If it is dirty, its previous data may be written back to memory 182 and then data may be read from memory 182 into the cache block. If it is not dirty, then data from the memory 182 may be read into the cache block. In the case of reading, the cache block may then be marked as not dirty and data may be returned. In the case of writing, the new data may be written into the cache block and the cache block may be marked as dirty. If there is a cache hit in the case of reading, the data may be returned. If there is a cache hit in the case of writing, the new data may be written into the cache block and the cache block may be marked as dirty.

To illustrate one benefit of the systems and methods disclosed herein, assume an example of different cache sets that are loaded non-contiguously into a cache. In this example, any pair of 8-byte blocks that are exactly 4 blocks apart (e.g., 32 bytes) are candidates to evict each other from the cache (where they map to the same cache set). But in any contiguous 4 blocks, the data may originate from different cache sets, none of which can evict each other, because they all map to different sets in the cache. Hence, it may be beneficial to group any data memory that is frequently accessed during a given time period into a contiguous region, so that it is evenly spread over the cache sets when mapped.

The decision tree module 180 may be used to improve the performance of the electronic device 102 and reduce bus traffic and cache misses. The decision tree module 180 may collect data created by the object detection module 112. For example, when the object detection module 112 uses a sliding window approach to adaptively select a scanning window of an image, a large amount of data trees may be created. The data trees may be accessed a large number of times during the sliding window approach to object detection. This may lead to intensive memory retrieval and storage occurring on the electronic device 102. The decision tree module 180 may store portions of the data trees (e.g., classifiers) in the cache memory 184 in the order accessed by the sliding window object detection algorithm to improve the retrieval and storage process. This approach may store data trees contiguously in cache memory 184 (e.g., portions of the data trees in a first stage may be followed by portions of the data trees in a second stage and so on). This approach may reduce the number of times the cache memory 184 needs to be accessed and may reduce the number of cache misses that occur. The first data tree and second data tree may be associated with different features in a sliding window object detection algorithm. Even though the sliding window object detection algorithm is mentioned, the systems and methods herein may be used with any object detection algorithm.

The decision tree module 180 may also access the portions of the data trees in the order of execution by the object detection algorithm. These two approaches may be used together or separately and may help to reduce the number of cache misses that occur during object detection. Storing and accessing the data trees contiguously in the cache memory 184 may reduce the number of cache misses during object detection and may result in lower latency for processing. Storing and accessing the data trees contiguously may also reduce the power consumption for processing, since the data trees that are more often accessed are more readily accessible.

The decision tree module 180 may also indicate to the object detection module 112 to increase step size of the object detection if a candidate object is detected in the previous scanning window. Object detection may have a high probability of detecting the candidate object again if the step size is not increased. Detecting the candidate object more than once may increase the amount of data trees created and may increase the bus traffic and probability of cache misses. Increasing the step size may reduce the number of scans and improve the running time to complete an image scan. Accordingly, a step size may be adjusted based on a previous scanning result. It should be noted that in a known sliding-window object detection algorithm, the window is scanned with either a fixed step or larger step if there is no object detected from the previous sliding window.

The decision tree module 180 may also load frequently grouped portions of decision trees to a fixed amount of memory. Access to the frequently grouped portions of decision trees may be based on the order of execution of the object detection algorithm. Storing the data trees in this fashion may reduce latency and time needed to complete an object detection scan in an object.

The local binary pattern module 186 may determine a local binary pattern feature. The local binary pattern feature may be used as part of the object detection process. The local binary pattern feature may be used for classification of objects in an image in computer vision. Computer vision is another term for acquiring, processing and analyzing images. The local binary pattern feature may be determined using a pre-trained classifier. In some configurations, the local binary pattern feature may be determined using one, two or four pointers. A pointer may indicate an edge of one or more areas in an object detection window.

Figure 2:
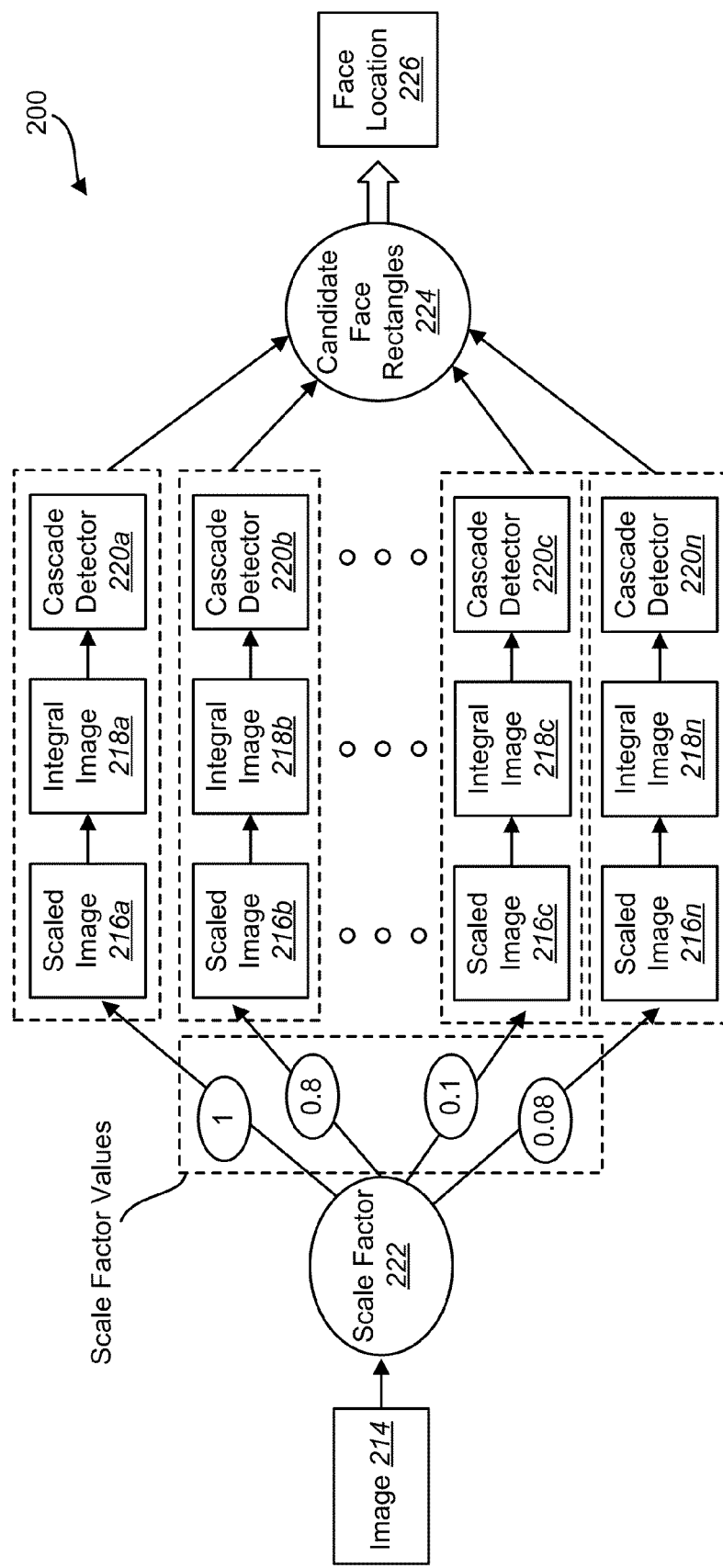
FIG. 2 is a block diagram illustrating an approach of sliding-window object detection.

FIG. 2 is a block diagram illustrating an approach of sliding-window object detection 200. Sliding-window object detection is a popular technique for identifying and localizing objects in an image. The image 214 may be passed through a scale factor 222 to obtain multiple scaled images of different sizes. This allows objects to be detected at any size. As an example, the Viola-Jones object detection framework is widely used in real time face detection algorithms.

In a Viola-Jones (VJ) framework for classification, each stage classifier may include a number of weak classifiers and a weak classifier score that is accumulated at the end of every corresponding stage. This is followed by a comparison of these accumulated weak classifier confidences against the stage threshold to make the decision as to whether a current window decision is a face or a non-face. Note that the stage threshold and range of weak classifier confidences are learned during the training process.

Object detection for each scaled image 216a-n may then be performed independently. The terms "stage" and "stage classifier" may be used interchangeably herein.

Each scaled image 216a-n may be converted to an integral image 218a-n. An integral image 218a-n is a data structure and algorithm for generating the sum of values in a rectangular subset of a grid. An integral image 218a-n may also be referred to as a summed area table. The value at any point (x, y) in an integral image 218a-n is the sum of all the pixels above and to the left of (x, y) inclusive:

$$I(x, y) = \sum_{\substack{x' \leq x \\ y' \leq y}} i(x', y').$$

Once an integral image 218a-n has been computed, the integral image 218a-n may be passed through a cascade detector 220a-n. The cascade detector 220a-n may output a candidate face rectangle 224 (if a face is detected) or an indicator indicating that no face is detected (e.g., "Not Face") if no face is detected from the integral image. The cascade detector is discussed in additional detail below in relation to FIG. 3. All of the candidate face rectangles from each of the scaled images may be merged. The face location 226 may then be determined and used for the object detection algorithm.

Figure 3:
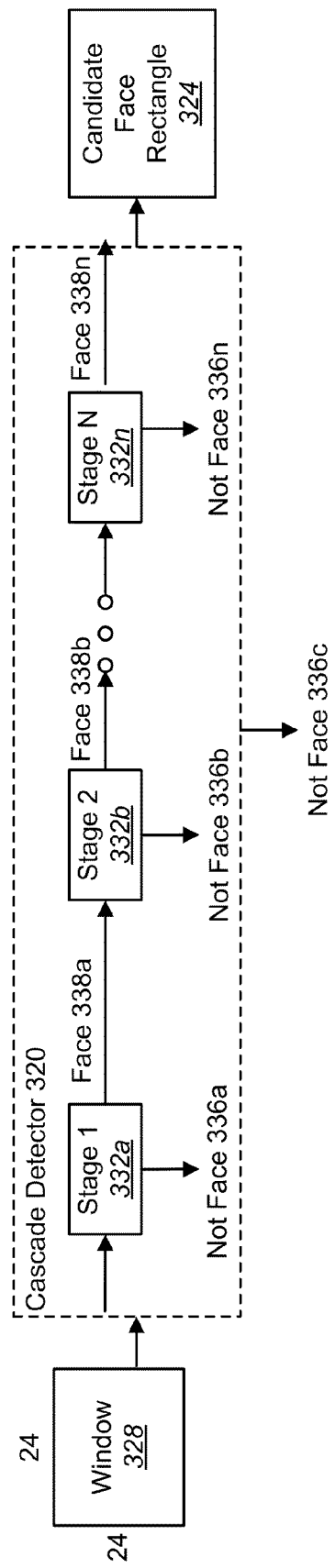
FIG. 3 is a block diagram of a cascade detector.

FIG. 3 is a block diagram of a cascade detector 320. The cascade detector 320 may receive a fixed-size rectangular window 328 which is a scanned portion of an image. In this example of a cascade detector 320, the fixed-size of the rectangular window 328 is a 24×24 scanned portion of an image. The cascade detector 320 may then apply a classifier to the sub-image defined by the fixed-size rectangular window 328. For each stage 332a-n (classifier), it is determined if there is potentially a face 338a-n or not face 336a-n located within the window 328. Based on all the stages 332a-n, the cascade detector 320 may then output either a candidate face rectangle 324 (if a face was detected) or Not Face 336a-n if no face was detected. The stage classifiers 332a-n are discussed in additional detail below in relation to FIG. 4.

Figure 4:
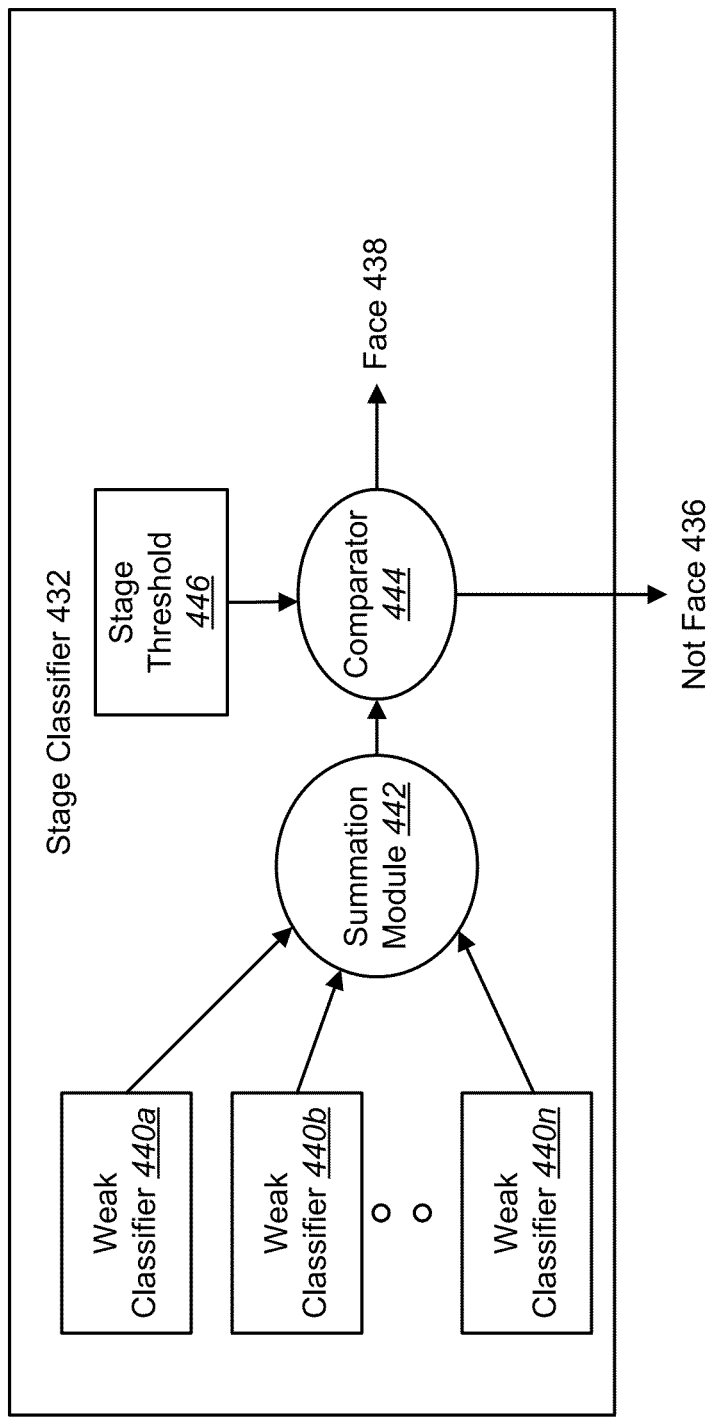
FIG. 4 is a block diagram illustrating a stage classifier.

FIG. 4 is a block diagram illustrating a stage classifier 432. The stage classifier 432 may include multiple weak classifiers 440a-n. Each weak classifier 440a-n may include multiple features. Each weak classifier 440a-n may evaluate an integral 218a-n image to determine whether specific features are found within the integral image 218a-n. Weak classifiers 440a-n are discussed in additional detail below in relation to FIG. 5.

The evaluations of each weak classifier 440a-n within the stage classifier 432 may be put through a summation 442 and then run through a comparator 444. The output of the summation 442 may be compared to a stage threshold 446 to obtain a face 438 or not face 436 decision. Thus, the stage classifier 432 may output a face 438 decision if the output of the summation of the evaluations of the weak classifiers 440a-n is greater than the stage threshold 446 and a not face 436 decision if the summation of the evaluations of the weak classifiers 440a-n is less than the stage threshold 446.

Figure 5:
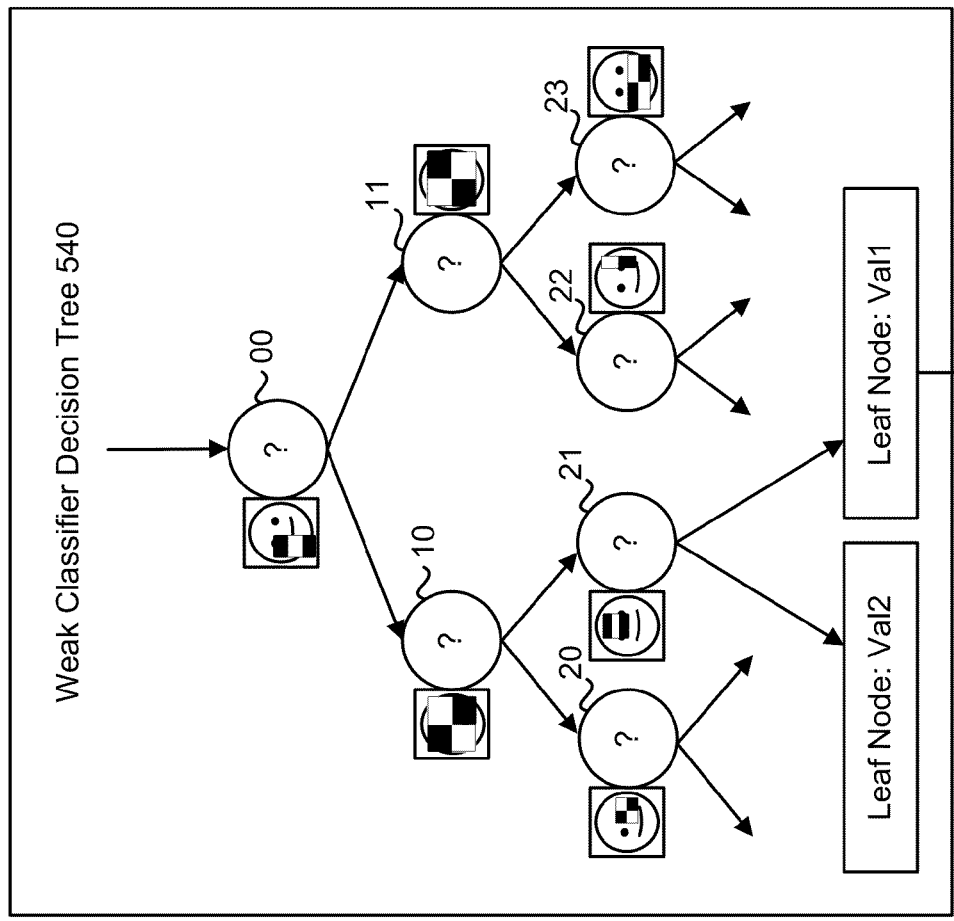
FIG. 5 is a block diagram illustrating a decision tree for a weak classifier.

FIG. 5 is a block diagram illustrating a decision tree for a weak classifier 540. The weak classifier 540 may include multiple features that are compared with the integral image 218 to make a face 438 or not face 436 determination. These features may be learned during the training process. The decision tree for a weak classifier 540 may be accessed a large number of times during an object detection algorithm. Thus, the requirement of the pre-trained classifier may lead to intensive memory accesses that may degrade the overall performance (due to cache misses and bus traffic). A known memory configuration of pre-trained classifiers is given in FIG. 8. By using a memory configuration for these pre-trained classifiers (as described below in relation to FIG. 7 and FIG. 9) in accordance with the systems and methods disclosed herein, cache misses and bus traffic may be reduced, improving the performance of the object detection algorithm.

The most frequently used tree levels (which are also the smallest in size) may be arranged contiguously in memory. Hence, they may not collide with other tree levels in the cache. This may result in reduced cache misses during tree traversal and hence less system network-on-chip (NOC) traffic, lower latency and less power consumption.

FIG. 5 illustrates one example of many trees that may be stored. The trees may be pre-computed and stored in tables. At run time, the cache may be populated with portions of the tables as they are accessed in the searches. The most top-level nodes may be the most frequently accessed, since the search may have many early-exit conditions for each tree, and many nodes in the lower levels may never be accessed or touched. For cache efficiency, it may be advantageous to group the most top-level nodes from all the trees in contiguous memory.

In a known approach, for example, the tree 540 may be stored in a node order as follows: 00, 10, 11, 20, 22, 23, etc., from a first tree, then a second tree in a similar order (e.g., nodes 00, 10, 11, 20, 22, 23, etc., from a second tree), then a third tree in a similar order. In accordance with the systems and methods disclosed herein, the nodes may be stored in a different order. For example, node 00 from a first tree may be stored, then node 00 from a second tree, then node 00 from a third tree, etc. Following the top nodes (nodes 00) in order, the next level for each tree may be stored (e.g., 10 and 11 from the first tree, 10 and 11 from the second tree, etc.). Then, the next level for each tree may be stored (e.g., 20, 21, 22 and 23 from the first tree, 20, 21, 22 and 23 from the second tree, etc.).

Figure 6:
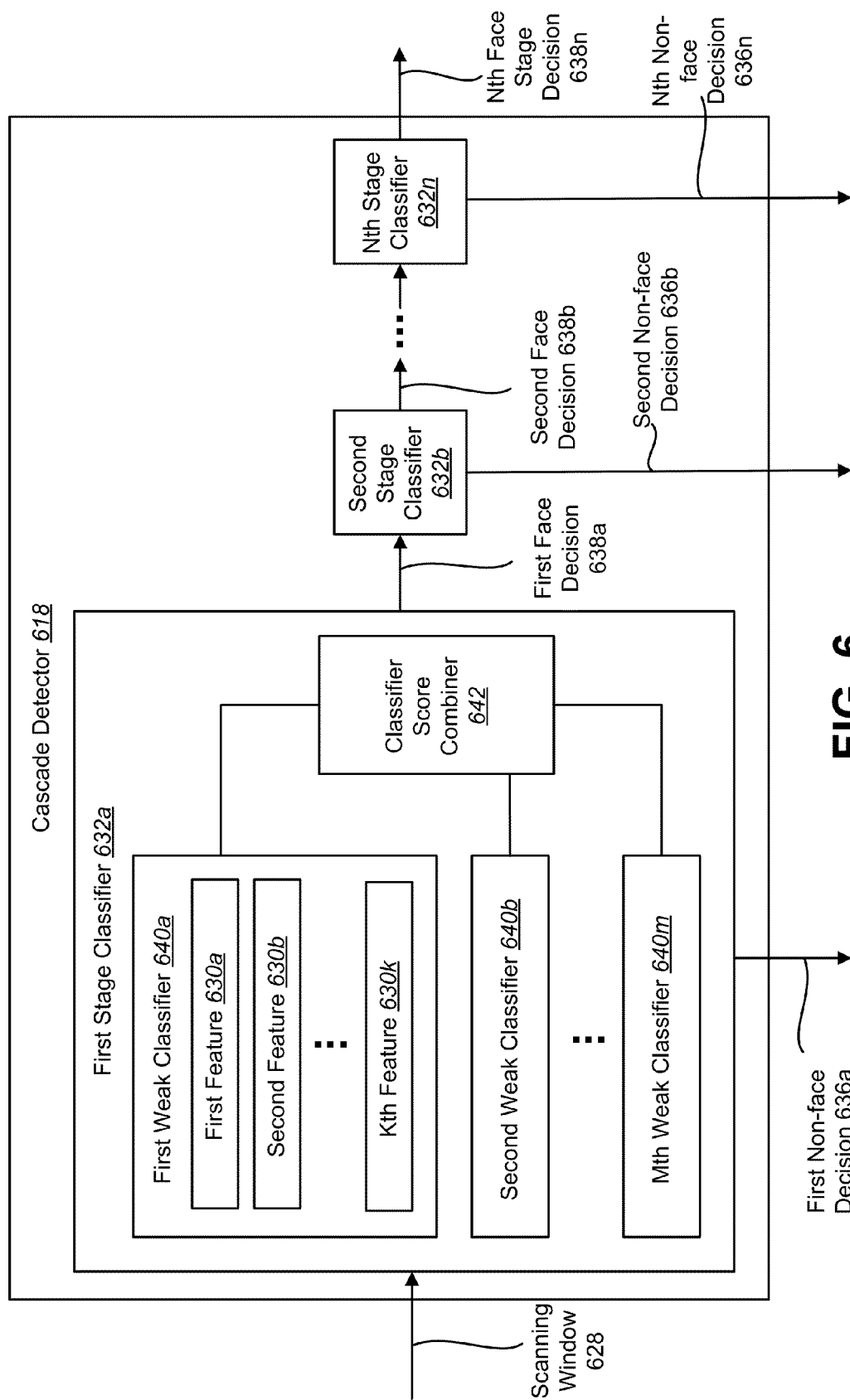
FIG. 6 is a block diagram of a cascade detector.

FIG. 6 is a block diagram of a cascade detector 618. The cascade detector 618 may include N (n=1, 2, . . . N) stage classifiers 632a-n. For example, the cascade detector 618 may include a first stage classifier 632a, a second stage classifier 632b and any number of additional stage classifiers 632n based on a number of stages determined during a training phase. Each stage classifier 632a-n may include multiple weak classifiers 640a-m (e.g., M weak classifiers), with each weak classifier 640a-m including multiple features 630a-k (e.g., K features). Further, each stage classifier 632a-n may include a summation module 442 for obtaining a combined weak classifier score based on the weak classifiers 640a-m that have been executed. The combined weak classifier score may be used to determine a face 638a-n or non-face 636a-n decision. The summation module 442 may also be used to determine a face, non-face or inconclusive weak classifier decision for the weak classifiers 640a-m that have been executed within a stage.

In one configuration, a first stage classifier 632a may receive a scanning window 628 (e.g., from the adaptive step image scanner). The first stage classifier 632a may examine a first stage to determine a first face decision 638a or a first non-face decision 636a for the first stage. The first stage decision may be based on an analysis of multiple weak classifiers 640a-m and features 630a-k within each weak classifier 640a-m. Thus, the first stage classifier 632a may receive a scanning window 628 and determine a first stage decision (e.g., face 638a or non-face 636a) for the scanning window 628 and output either a first face decision 638a or a first non-face decision 636a. Upon completion of some or all of the stages, the cascade detector 618 may output a confidence value for the scanning window 628. The confidence value may be used to determine a face or non-face window decision. In some configurations, the confidence value may give a level of certainty associated with the face or non-face window decision, which may be provided as an output of the cascade detector 618. As described above, this confidence value may be used in selecting a subsequent scanning window 628 or a step size between scanning windows 628. Further, the face/non-face window decision may be based on a comparison of the confidence value to a specific threshold.

In determining a face or non-face window decision, each stage classifier 632a-n may be executed to output a stage decision (e.g., a face 638a-n or a non-face 636a-n decision) for each individual stage. If a stage decision is determined to be non-face, the cascade detector 618 may terminate further execution of the stages and output a non-face window decision for the selected scanning window 628 (e.g., without examining subsequent stages). Conversely, if a stage decision is determine to be face, a next stage may be examined using a subsequent stage classifier 632a-n. Upon examination of each stage, and determining a face decision 638a-n at the output of each stage classifier 632a-n, the cascade detector 618 may output a face window decision for the selected scanning window. This, an Nth face stage decision 638n may be the equivalent of a face window decision for the cascade detector 618. In some configurations, if any of the stage classifiers 632a-n outputs a non-face decision 636a-n, the cascade detector 618 may cease examining subsequent stages and output a non-face window decision for the scanning window 628. Thus, any of the non-face stage decisions 636a-n may be equivalent to a non-face window decision of the cascade detector 618. In this example, the cascade detector 618 may only output a face window decision for a scanning window 628 upon examining each of the stages with each stage classifier 632a-n outputting a face stage decision 638a-n.

In one configuration, the classifier confidence value may be determined based on which stage in the cascade detector the current scanning window 628 has exited out (e.g., if a scanning window 628 exited early in the cascade stage, it has lower probability of being a face than a scanning window 628 that exited after executing all stage classifiers 632a-n). For example, in a configuration with 12 stage classifiers 632, a scanning window 628 that exits after stage 1 may have a lower probability (e.g., $1/12$) than a scanning window 628 that exits after stage 7 (e.g., $7/12$). Such a probability may be used as or converted to a classifier confidence value. For example, if the probability is $1/12$, the next step size may be 3× the current step size. Additionally, if the probability is $6/12$, the next step size may be equal to the current step size. Further, if the probability is $10/12$, the next step size may be half the current step size. Other scales may be used when determining subsequent step sizes. Moreover, the stage number where the scanning windows 628 exits may also be combined with a deviation measure in making further step size adaptations (e.g., how different is a weak classifier or stage score from the stage threshold 446).

Each stage classifier 632a-n may also include M (m=1, 2, . . . M) weak classifiers 640a-m. For example, a first stage classifier 632a may include a first weak classifier 640a, a second weak classifier 640b and any number of additional weak classifiers 640m (e.g., M classifiers) determined during a training phase. Weak classifiers 640a-m may correspond to a simple characteristic or feature of a scanning window 628 that provides an indication of the presence or absence of a face within the scanning window 628. In some configurations, a first weak classifier 640a is executed to determine a first weak classifier score. A weak classifier score may be a numerical value indicating a level of confidence that a stage will produce a stage decision of face or non-face (e.g., corresponding to a likelihood that a face is present or not present within a scanning window). In some configurations, the weak classifier score is a number between −1 and 1. Alternatively, the weak classifier score may be a number between 0 and 255 or another range of numbers depending on possible outcomes of the weak classifier 640a-m. The first weak classifier 640a may also be examined to determine a first weak classifier decision. A weak classifier decision may be a face, non-face or inconclusive decision. A weak classifier face decision may be based on a comparison with a face threshold. A weak classifier non-face decision may be based on a comparison with a non-face threshold. A weak classifier inconclusive decision may be based on both comparisons of the face and non-face thresholds (e.g., where a weak classifier decision is not a face or a non-face decision).

In one example, a first weak classifier 640a is executed to determine a first weak classifier decision and a first weak classifier score. If the first weak classifier decision is a face, the first stage classifier 632a may cease execution of the remaining weak classifiers 640b-m, output a first face decision 638a and proceed onto execution of a second stage classifier 632b. Conversely, if the first weak classifier decision is a non-face, the first stage classifier 632a may cease execution of the remaining weak classifiers 640b-m and output a first non-face decision 636a. In this case, because the first stage classifier 632a outputs a non-face decision 636a, the cascade detector 618 may output a non-face window decision for the scanning window 628 and a confidence value. In another configuration, where the first weak classifier 640a outputs an inconclusive weak classifier decision, the first weak classifier 640a may provide a first weak classifier score to the summation module 642 and proceed to examine a second weak classifier 640b. In this case, evaluating the second weak classifier score may include determining a second weak classifier score and providing the second weak classifier score to the summation module 642.

The summation module 642 may determine a weak classifier decision for the second weak classifier 640b based on the combined outputs of the first weak classifier 640a and the second weak classifier 640b. This combined result may be used to determine a face, non-face or inconclusive weak classifier decision for the second weak classifier 640b. Similar to examination of the first weak classifier 640a, if the second weak classifier decision is a face or non-face decision, the first stage classifier 632a may cease execution of subsequent weak classifiers 640c-m and output a face 638a-n or non-face 636a-n decision. Alternatively, if the second weak classifier decision is inconclusive, subsequent weak classifiers 640c-m within the first stage classifier 632a may be executed.

Moreover, each weak classifier 640a-n may include multiple features (e.g., K features) 630a-k that may be examined to determine a face, non-face, or inconclusive decision for each weak classifier 640a-m. In some configurations, the features 630a-k may be local binary pattern (LBP) features. In some configurations, an LBP feature may be a byte associated with a pixel that indicates intensity of the pixel relative to its 8 neighbor pixels. Specifically, if the pixel of interest has a higher intensity than a first neighboring pixel, a '0' bit may be added to the LBP feature. Conversely, if the pixel of interest has a lower intensity than a second neighboring pixel, a '1' bit may be added to the LBP feature for the pixel of interest. These LBP features may be learned during training prior to face detection (based on Adaboost or any other machine learning technique, for example). In this way, each pixel in a scanning window may be associated with an 8-bit LBP feature. Therefore, in an example of a 24×24 pixel face, the face may have close to 10,000 LBP features.

LBP may be a type of feature used for classification in computer vision. LBPs may be defined as $$MB-LBP = \sum_{i=1}^{8} s(g_i - g_c)2^i,$$

where $g_c$ is an average intensity of a center rectangle, $g_i$ (i=0, ..., 8) are those of its neighborhood rectangles $$s(x) = \begin{Bmatrix} 1, & \text{if } x > 0 \\ 0, & \text{if } x < 0 \end{Bmatrix}.$$

MB−LBP denotes multiblock LBP. Examples of LBP features are given in connection with FIGS. 13A-13B. Each rectangle's value may be computed as three operations including two additions and one subtraction. For example, the first rectangle may be (p[5]+p[0])−(p[1]+p[4]).

Additionally or alternatively, the weak classifier features 630a-k may include other types of features (e.g., Haar features). Moreover, by using an integration approach when examining features, the sum of the intensity of an image patch can be calculated using only 4 memory access. For example, to find the average intensity of an image in a 3×3 patch, a traditional approach may include accessing all 9 pixels and calculating a sum. Using an integral approach, an image may be scaled and integrated such that only 4 memory accesses are used to compute a sum of the intensity of an image patch. Thus, performing face detection using an integral approach may use less processing on an electronic device 102.

In examining the features 630a-k within a weak classifier 640a-m, some or all of the features 630a-k may be analyzed to obtain a weak classifier decision and a weak classifier score. In one configuration, only a portion of the K features 630a-k are analyzed in examining a weak classifier 640a-m. Further, examining a weak classifier 640a-m based on the K features 630a-k may include traversing a node tree of the weak classifier features 630a-k. Traversing a node tree may include evaluating a first level of the node tree to determine a next node on a next level of the node tree to evaluate. For example, a weak classifier 640a-m may be examined by traversing a node tree and only examining one feature 630a-k per level of the node tree.

Figure 7:
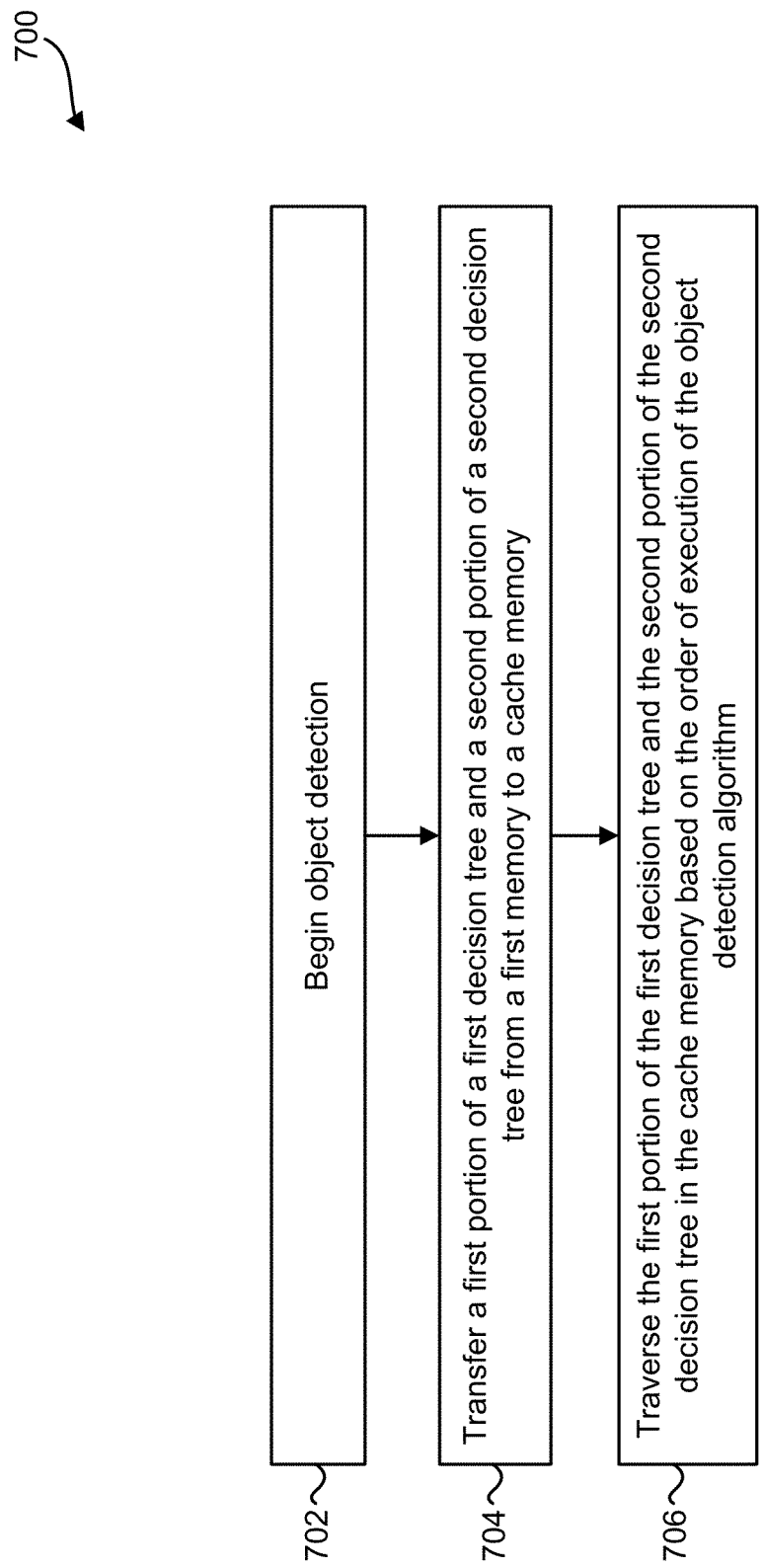
FIG. 7 is a flow diagram illustrating one configuration of a method for object detection.

FIG. 7 is a flow diagram illustrating one configuration of a method 700 for object detection. The method 700 may be performed by an electronic device 102. The electronic device 102 may begin 702 object detection on an image. For example, the electronic device 102 may begin to perform object detection in accordance with one or more of the approaches described herein.

The electronic device 102 may transfer 704 a first portion of a first decision tree and a second portion of a second decision tree from a first memory 182 to a cache memory 184. The first memory 182 may be internal memory and/or external memory. The first portion and second portion of each decision tree may be stored contiguously in the first memory 182. The first decision tree and the second decision tree may each be associated with a different feature of an object detection algorithm. In some configurations, the first portion of the first decision tree may be a level. Alternatively, the first portion of the first decision tree may also be more than one level. The second portion of the second decision tree may be a level or more than one level. An example of memory utilization (e.g., a memory storage approach) in accordance with the systems and methods disclosed herein is described below in relation to FIG. 9.

The electronic device 102 may traverse 706 the first portion of the first decision tree and the second portion of the second decision tree in the cache memory 184 based on the order of execution of the object detection algorithm. This may reduce cache misses, which may improve performance (e.g., efficiency and/or speed) of object detection.

The method 700 may be applicable to any sliding-window object detection/tracking algorithm. A feature 630a-k in the object detection algorithm may be an LBP feature or a Haar feature, for example. Reducing cache misses may result in lower latency for processing the object detection algorithm compared to when the first portion and the second portion are not contiguously arranged in the first memory. Reducing cache misses may also result in reduced power consumption for processing the object detection algorithm compared to when the first portion and the second portion are not contiguously arranged in the first memory.

In some configurations, the method 700 may include loading frequently grouped portions of decision trees together to fit in a fixed memory size and accessing the frequently grouped portions of the decision trees based on the order of execution of an object detection algorithm. As described above, the feature in the object detection algorithm may include a local binary pattern (LBP) feature.

Figure 8:
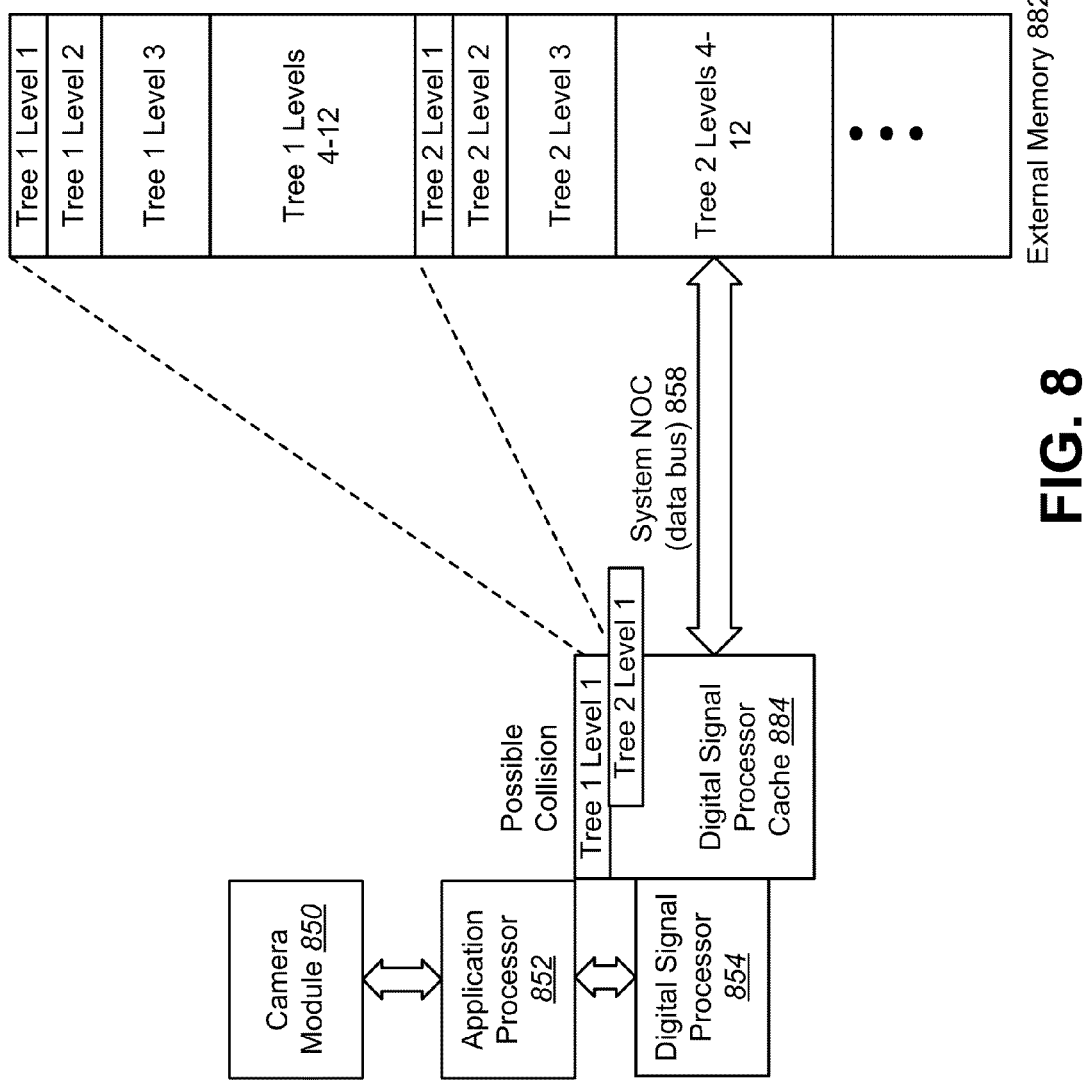
FIG. 8 is a block diagram illustrating how different tree levels are typically stored in external memory.

FIG. 8 is a block diagram illustrating how different tree levels are typically stored in external memory 882. In other words, FIG. 8 illustrates a known approach for storing trees. A camera module 850 may communicate with an application processor 852. The application processor may communicate with a digital signal processor (DSP) 854. The DSP 854 may maintain a DSP cache 884. The DSP cache 884 may access external memory 882 when a tree is used. The most frequently used tree levels (1 followed by 2 followed by 3 etc.) may be spaced far apart in the external memory 882. During tree traversal, accessing these levels from different trees can cause cache collisions and evictions (due to their sparse locations in memory 882), which may necessitate repeated external memory 882 accesses via the system NOC 858 for the same nodes. Accessing the different tree levels using this approach may be inefficient.

Figure 9:
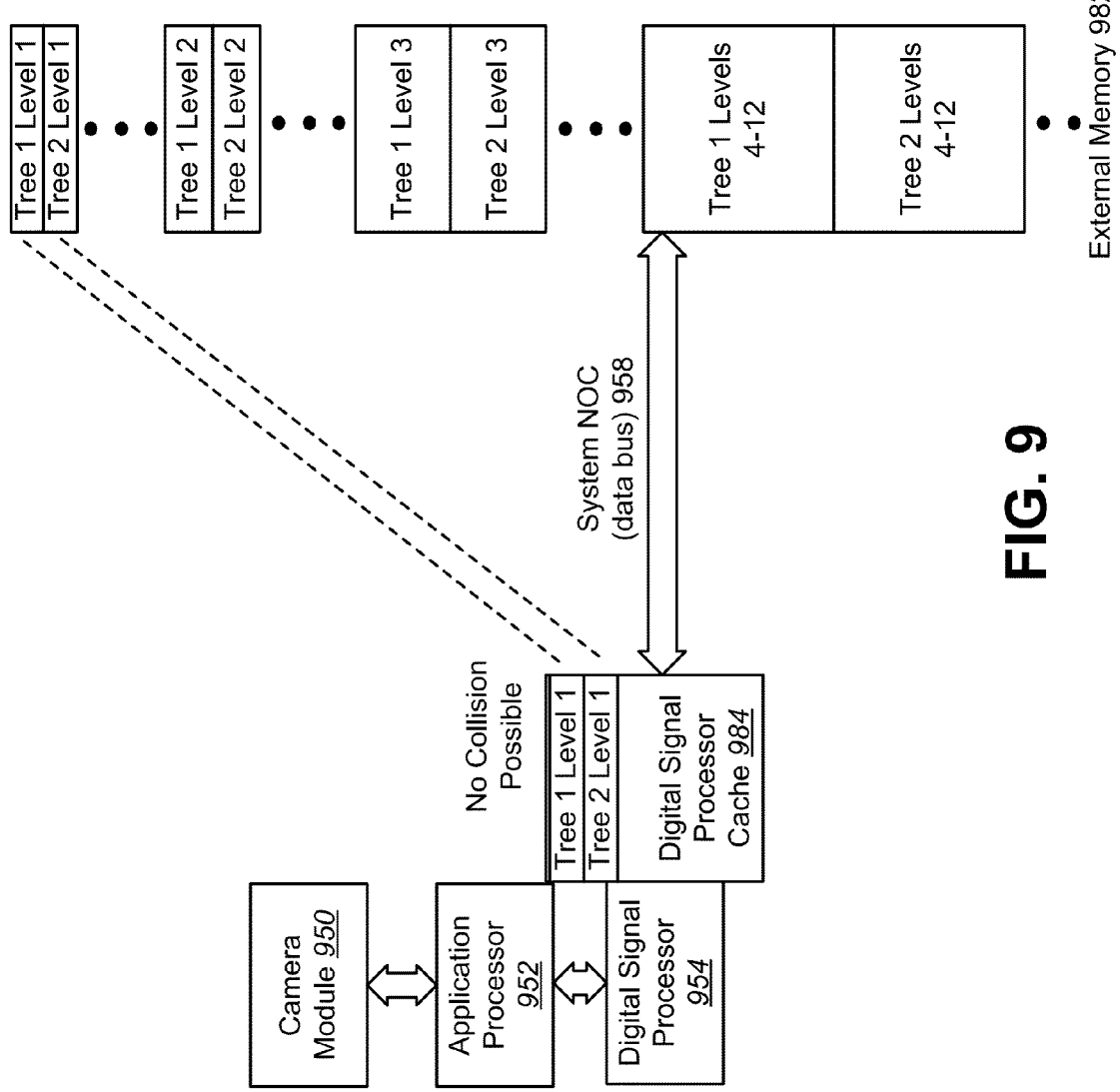
FIG. 9 is a block diagram illustrating trees stored in external memory in the order accessed by an object detection algorithm.

FIG. 9 is a block diagram illustrating trees stored in external memory 982 in the order accessed by an object detection algorithm. A camera module 950 may communicate with an application processor 952. The application processor 952 may communicate with a DSP 954. The DSP 954 may maintain a DSP cache 984. The most frequently accessed levels of all the trees (e.g., levels 1, 2 and 3) may be contiguous in external memory 982. The trees may be pre-computed and stored in tables. At run time, the DSP cache 984 is populated with portions of the tables as they are accessed in the searches. The most top-level nodes are more frequently accessed, since the search has many early-exit conditions for each tree (and many nodes in the lower levels are never touched). Hence, for cache efficiency, it may be advantageous to group the most top-level nodes from all the trees in contiguous memory. Specifically, reducing cache misses may result in lower latency for processing the object detection algorithm compared to when the first portion and second portions are not contiguously arranged in the first memory. Additionally or alternatively, reducing cache misses may result in less power consumption for processing the object detection algorithm compared to when the first portion and second portions are not contiguously arranged in the first memory.

The most frequently accessed levels of all the trees may not be contiguous in the DSP cache 984. Because the most frequently accessed levels of all the trees (which may be the smallest in size, for example) are contiguous (e.g., arranged contiguously) in external memory 982, a collision in the cache is much less likely. This may result in reduced cache misses during tree traversal. Therefore, the levels of the tree are less likely to evict each other when they are accessed. This may result in reduced bus 958 (e.g., system NOC) traffic (as a result of the lower cache collision rate), lower latency and/or less power consumption as compared to random storage of trees in memory.

An electronic device may include external memory 982 and a cache (e.g., DSP cache 984). In some configurations, it may be unpredictable that the ordering in external memory 982 will be preserved into the cache 984. For example, the cache may be randomized so that any given level from any given tree is not likely to be contiguous in the cache 984. Additionally, it may not be expected that all levels of all trees may fit in the cache 984 at any given time.

One benefit of the systems and methods disclosed herein may be that the most frequently accessed levels of all the trees (e.g., levels 1, 2 and 3) are all contiguous in the external memory 982. While they may or may not be contiguous in the cache 984, because they are contiguous in the external memory 982, they are less likely to collide in the cache 984 and evict each other when they are accessed. Accordingly, there may be reduced bus 958 traffic as a result of the lower cache collision rate.

Figure 10:
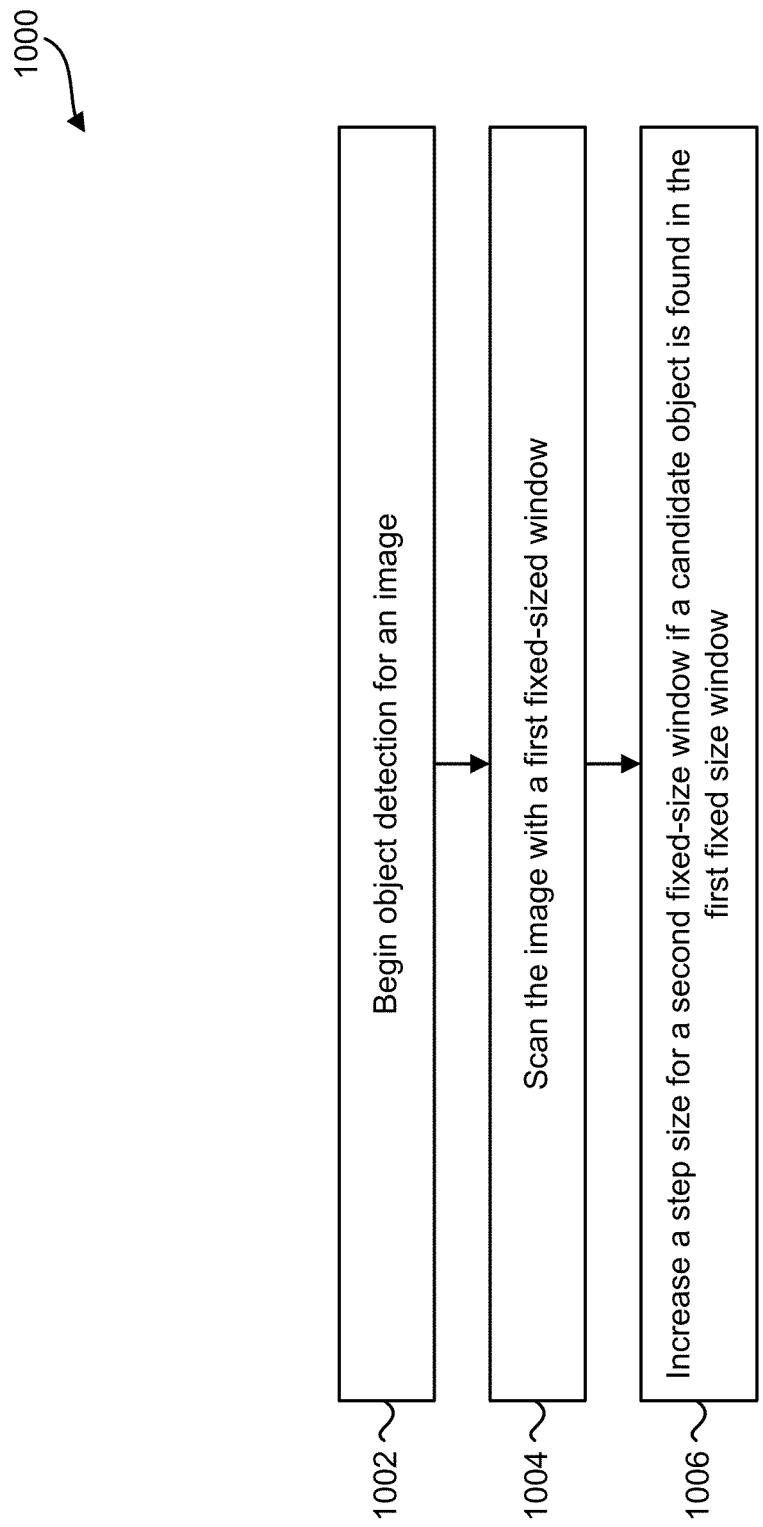
FIG. 10 is a flow diagram of a method for increasing step size between scan windows if a candidate object is found.

FIG. 10 is a flow diagram of a method 1000 for increasing step size between scan windows if a candidate object is found. The method 1000 may be performed by an electronic device 102. The electronic device 102 may begin 1002 object detection for an image. The electronic device 102 may scan 1004 the image with a first fixed-size window. The electronic device 102 may increase 1006 the step size for a second fixed-size window if a candidate object is found in the first fixed-size window. For example, if the original step size is s1 (the distance to move the current scanning window to the next location within the image) and a candidate object is found in the current scanning window, the step size may be changed to s2 (s2>s1). This is because if a candidate object was already found, the probability is very high that the same object would be found in a nearby scanning window. By increasing the step size, unnecessary object detection may be avoided, increasing the speed of the object detection algorithm (by reducing the number of scans). The method 1000 may be applicable to any sliding-window object detection/tracking algorithm.

Figure 11:
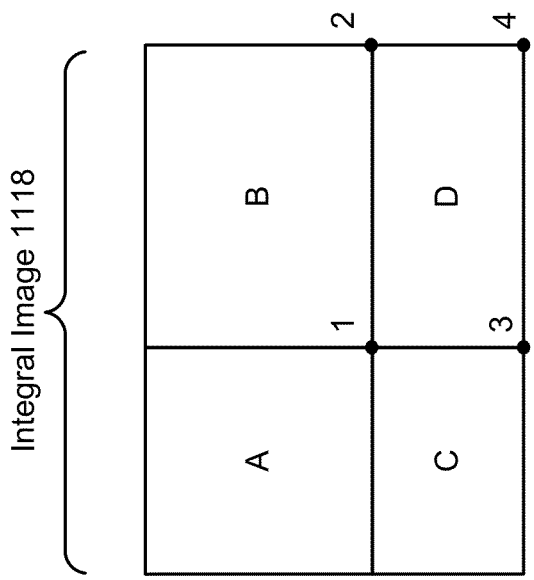
FIG. 11 illustrates an integral image for use in the present systems and methods.

FIG. 11 illustrates an integral image 1118 for use in the present systems and methods. In the integral image 1118 illustrated, there are four rectangles A, B, C and D. There are also four points 1, 2, 3 and 4 within the integral image 1118. Once an integral image 1118 has been computed, the task of evaluating any rectangle can be accomplished in constant time with just four memory accesses. For example, the sum of the pixels within rectangle D can be computed with four array references. The value of the integral image 1118 at location 1 is the sum of the pixels in rectangle A. The value at location 2 is A+B. The value at location 3 is A+C. The value at location 4 is A+B+C+D. The sum within D can be computed as 4+1−(2+3). Some applications of the integral image may include an object detection framework (e.g., Viola-Jones), feature detection/matching (e.g., Speeded Up Robust Features (SURF)) and/or calculating an LBP.

Figure 12:
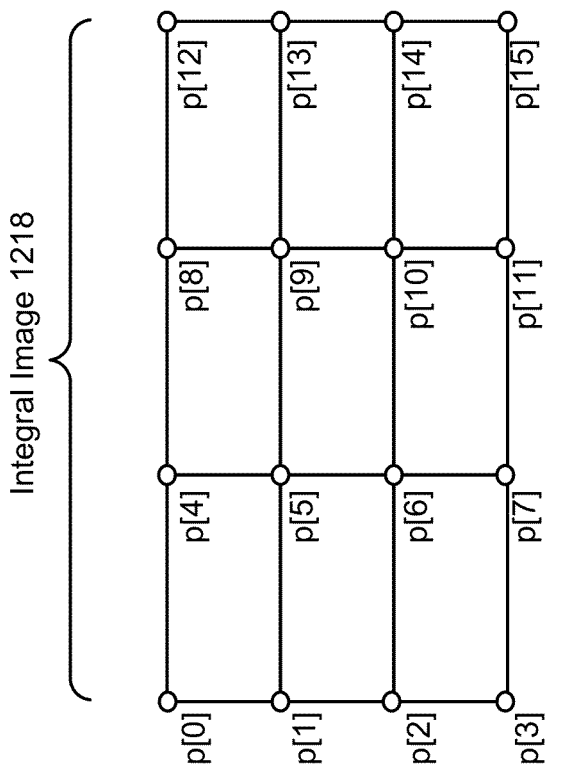
FIG. 12 illustrates the use of pointers in an integral image.

FIG. 12 illustrates the use of pointers in an integral image 1218. Each pointer refers to the value of the referenced point. The pointers may be used to compute a LBP from the integral image 1218. Since three operations (two additions and one subtraction) are used to obtain the value of one rectangle, it may use 9*3=27 operations to obtain the values of all nine rectangles in the integral image 1218 (and thus to compute the LBP for the integral image 1218). Benefits may be realized by reducing the number of operations used to obtain the values of all nine rectangles and compute the LBP. For example, an object detection algorithm may be able to process object detection in reduced time, approximating real-time use.

Figure 13A:
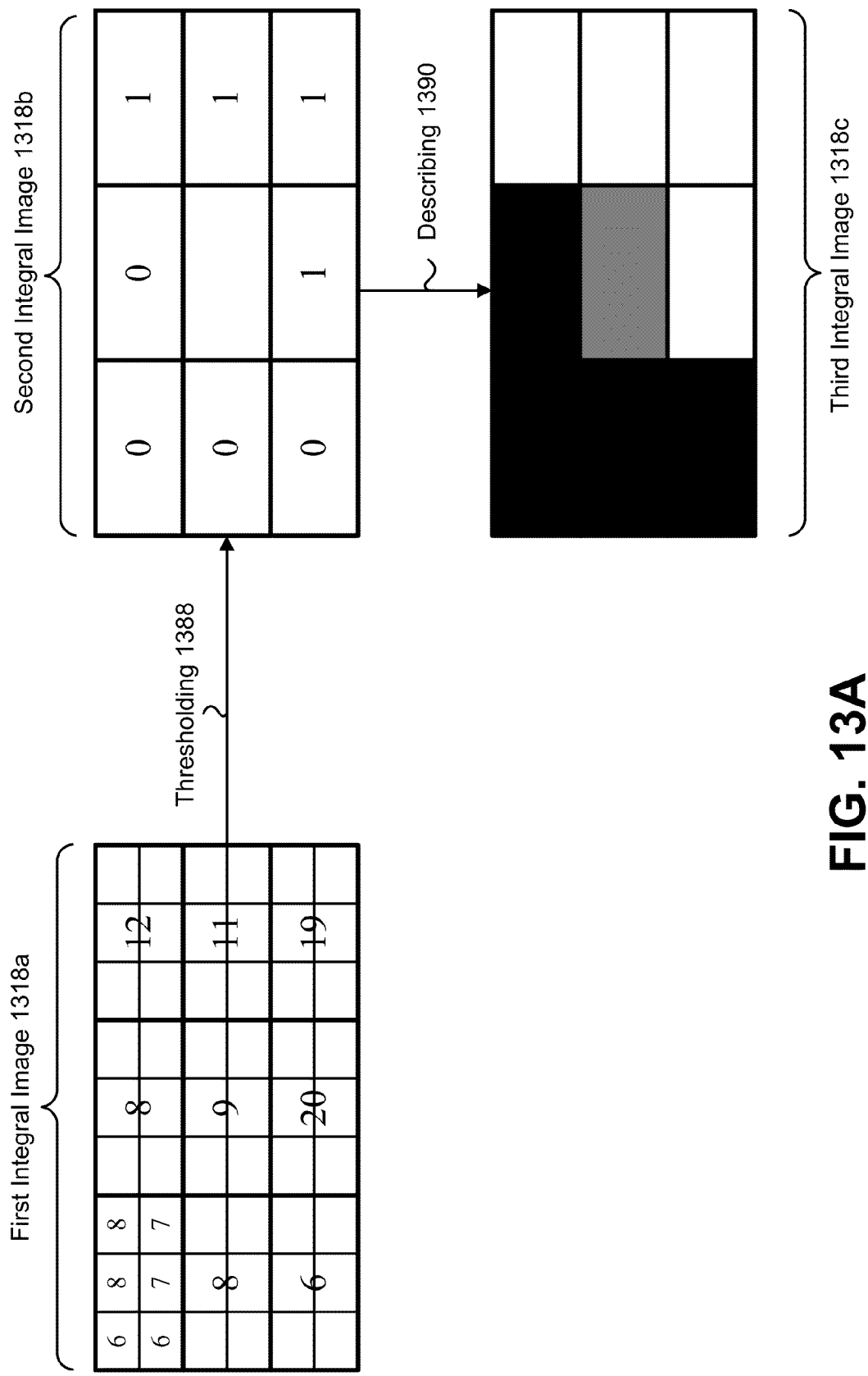
FIG. 13A is an example of determining a single local binary pattern feature.

FIG. 13A is an example of determining a single local binary pattern feature. A local binary pattern feature may be determined using three integral images 1318a-c. Each integral image 1318a-c is made up of a three by three grid of large blocks. Each large block is made up of a two by three grid of smaller blocks. The value of a neighboring large block may be determined in a counterclockwise pattern and compared to the value of the large block in the center of the first integral image 1318a. Some of the small block values and large block values are indicated in the first integral image 1318a. In the first integral image 1318a, the large block in the upper left hand corner is made up of six small blocks with values of: 6, 6, 7, 7, 8 and 8. The average value of the large block in the upper left hand corner in the first integral image 1318a would be 7. The first integral image 1318a includes nine large blocks with average values of: 7, 8, 12, 8, 9, 11, 6, 20 and 19.

In order to determine the local binary pattern feature for the large blocks, the value of the center large block may be compared to the value of the outer large blocks. If the value of the outer large block is less than the value of the center block, the outer large block is given a value of 0. For example, in the first integral image 1318a, the center large block has a value of 9 and the outer large block in the lower left has a value of 6. In the second integral image 1318b, the outer large block in the lower left receives a new value of 0. If the value of an outer large block is greater than or equal to the center block, the outer large block is given a value of 1. For example, in the first integral image 1318a, the center large block has a value of 9 and the outer large block in the upper right has a value of 12. In the second integral image 1318b, the outer large block in the upper right receives a new value of 1.

The second integral image 1318b includes thresholding values of the blocks. The conversion of the value of the large blocks from the average value to a compared value may be determined by thresholding 1388. In this example, the outer large blocks have values of 0, 0, 1, 1, 1, 1, 0 and 0. The center large block may not receive a thresholding 1388 value, since it is used to compare all of the other large blocks. The second integral image 1318b may be a digital output of the first integral image 1318a.

The large blocks may then be described and converted to grayscale as shown in the third integral image 1318c. The larger blocks may be converted to grayscale by describing 1390 the large blocks. Any of the large blocks that have a value of 0 are described 1390 with the color black and the large blocks with a value of 1 are described 1390 with the color white. In one example, an LBP feature may be an 8 bit number of a 3 by 3 block. For instance, for the first integral image 1318a, the corresponding LBP feature is 00111100 in binary form. LBP features are heavily used in face detection algorithms. This method may be completed on grids of any N×N sized grid and may provide the local binary pattern feature of larger or smaller grids than shown in FIG. 13A.

Figure 13B:
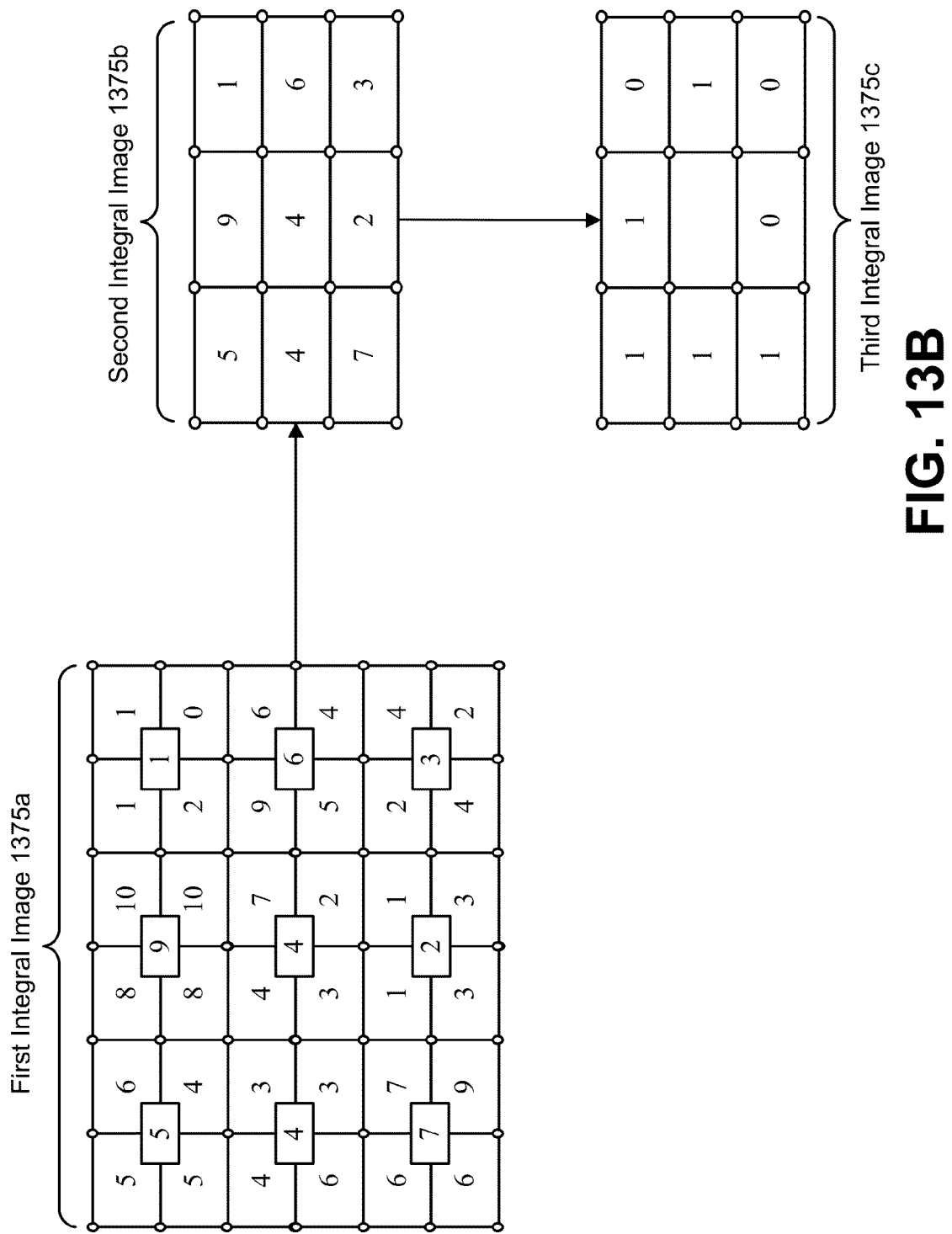
FIG. 13B is another example of determining a single local binary pattern feature.

FIG. 13B is another example of determining a single local binary pattern feature. A local binary pattern feature may be determined using three integral images 1375a-c. A first integral image 1375a may be made up of a six by six grid of large blocks. Each large block may have a value that is used to determine an average value for four large blocks. For example the four large blocks in the upper left hand corner of the first integral image 1375a have values of 5, 5, 6 and 4. The average value of the four large blocks is 5. The average value of different groupings of four large blocks are used to create the second integral image 1375b. The second integral image 1375b may be used to determine the binary value of each block in the second integral image 1375b. The binary value is determined by comparing the average value in each large block on an outer ring of large blocks in the second integral image 1375b to the average value in the large block located in the center. In this example, the center large block has an average value of 4. Each large block in the outer ring will be compared to the value of 4. If the value in the large block is greater than or equal to 4, the large block is given a binary value of 1. If the value is less than 4, the large block is given a binary value of 0. This comparison provides the results shown in third integral image 1375c. In this example, the outer ring of large blocks has a binary value of 11010011. The binary pattern is determined by traversing the outer ring of the third integral image 1375c in a clockwise order starting in the upper left large block.

Figure 14:
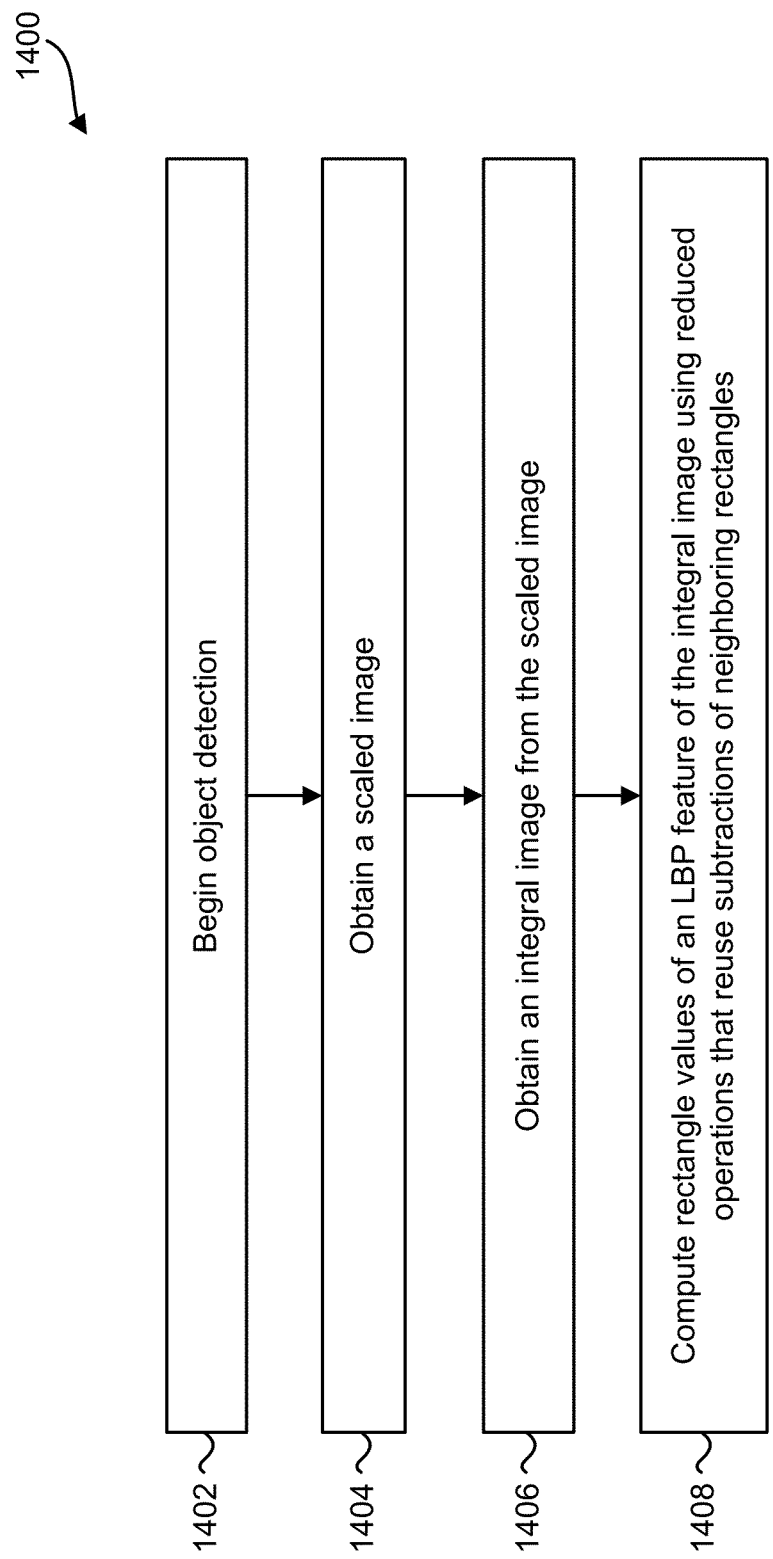
FIG. 14 is a flow diagram illustrating one configuration of a method for computing the local binary pattern (LBP) of an integral image.

FIG. 14 is a flow diagram illustrating one configuration of a method 1400 for computing the LBP of an integral image 218a-n. The method 1400 may be performed by an electronic device 102. The electronic device 102 may begin 1402 object detection. The electronic device 102 may obtain 1404 a scaled image. The electronic device 102 may obtain 1406 an integral image 218a-n from the scaled image 216a-n. The electronic device 102 may compute 1408 rectangle values of an LBP feature of the integral image 218a-n using reduced operations that reuse subtractions of neighboring rectangles. Computing the rectangle values 224 of an LBP feature of the integral image 218a-n using reduced operations may include the steps of computing all reusable subtraction values for the integral image 218a-n (described below in relation to FIG. 15) and reusing the reusable subtraction values to compute the rectangles 224 of the integral image 218a-n (described below in relation to FIG. 16).

Figure 15:
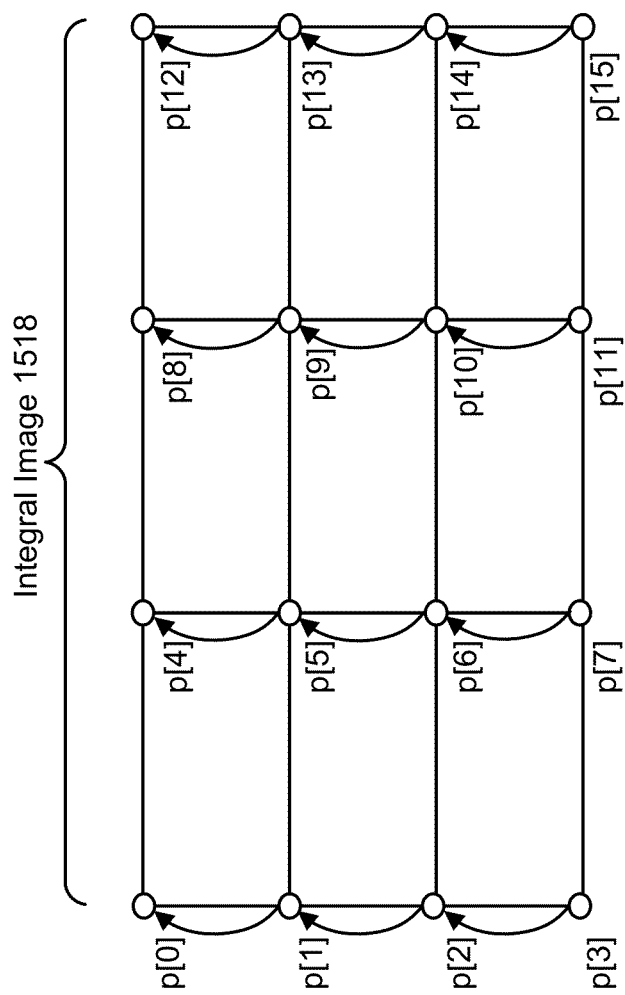
FIG. 15 illustrates computing all reusable subtraction values for the integral image.

FIG. 15 illustrates computing all reusable subtraction values for the integral image 1518. The integral image 1518 includes 16 points p[0] through p[15]. As discussed above, the value at any point is the sum of all the pixels above and to the left of the pixel. The reusable subtraction values may be computed for the integral image 1518. The reusable subtraction values may be represented as q[0] through q[11]. Thus, q[0]=p[1]−p[0], q[1]=p[2]−p[1], q[2]=p[3]−p[2], q[3]=p[5]−p[4], q[4]=p[6]−p[5], q[5]=p[7]−p[6], q[6]=p[9]−p[8], q[7]=p[10]−p[9], q[8]=p[11]−p[10], q[9]=p[13]−p[12], q[10]=p[14]−p[13] and q[11]=p[15]−p[14]. FIG. 15 thus illustrates 12 operations.

Figure 16:
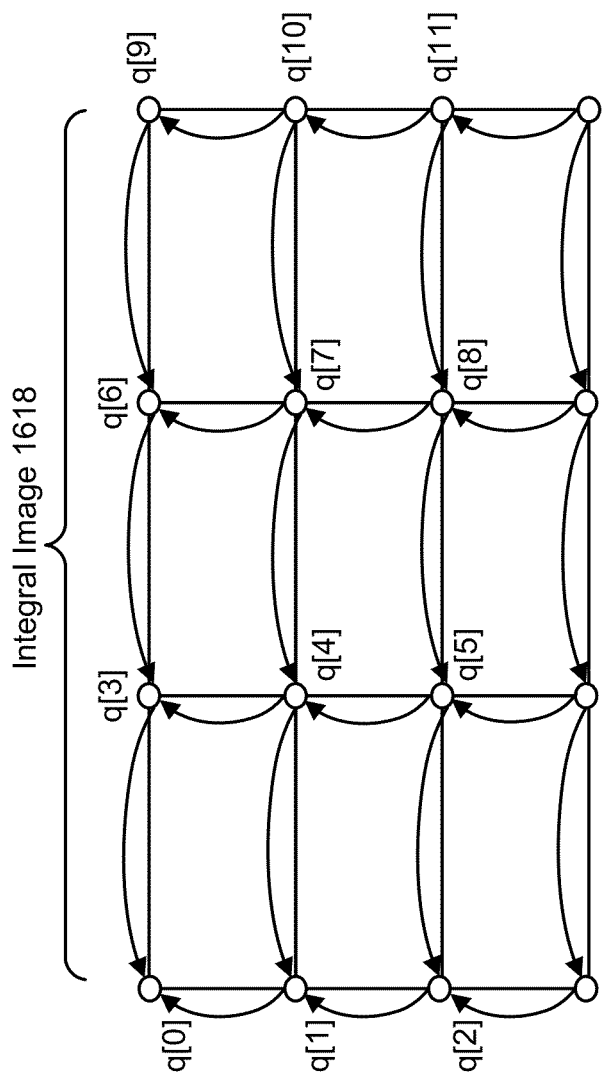
FIG. 16 illustrates reusing the reusable subtraction values to compute the rectangles of an integral image.

FIG. 16 illustrates reusing the reusable subtraction values to compute the rectangles of an integral image 1618. The integral image 16118 includes the 12 reusable subtraction values q[0] through q[11]. For example, q[0]=p[1]−p[0]; q[1]=p[2]−p[1]; q[2]=p[3]−p[2]; q[3]=p[5]−p[4]; q[4]=p[6]−p[5]; q[5]=p[7]−p[6]; q[6]=p[9]−p[8]; q[7]=p[10]−p[9]; q[8]=p[11]−p[10]; q[9]=p[13]−p[12]; q[10]=p[14]−p[13]; q[11]=p[15]−p[14]. The reusable subtraction values may be used/reused to compute the rectangles of the integral image 1618. Rectangle 1 may be computed as q[3]−q[0]. Rectangle 2 may be computed as q[6]−q[3]. Rectangle 3 may be computed as q[9]−q[6]. Rectangle 4 may be computed as q[4]−q[1]. Rectangle 5 may be computed as q[7]−q[4]. Rectangle 6 may be computed as q[10]−q[7]. Rectangle 7 may be computed as q[5]−q[2]. Rectangle 8 may be computed as q[8]−q[5]. Rectangle 9 may be computed as q[11]−q[8]. Thus, all the rectangles in the integral image 1618 may be computed using the 12 steps to compute all the reusable subtraction values and then using the reusable subtraction values to compute the 9 rectangles. Reusable subtraction reduces the number of operations to compute all the rectangles in an integral image from 9*3=27 to 9+12=21.

The steps used to compute all the rectangles may be generalized for two cases: m≤n and m>n, where m represents the number of rows of rectangles in an integral image and n represents the number of columns of rectangles in the integral image 1618. For m≤n, the number of operations can be reduced from 3*m*n to m*(2*n+1). This is illustrated by the operations described in connection with FIGS. 15-16 (e.g., the number of "vertical" operations is m*(n+1) and the number of "horizontal" operations is m*n). For m>n, the number of operations can be reduced from 3*m*n to n*(2*m+1). For example, horizontal operations may be followed by vertical operations (where n is the number of rectangle columns and m is the number of rectangle rows, for instance). Accordingly, for example, vertical operations (e.g., subtractions) may be performed first followed by horizontal operations (e.g., subtractions) for m≤n and horizontal operations may be performed first followed by vertical operations (e.g., subtractions) for m>n. In some configurations, this approach may be optimized by parallelization such as single instruction, multiple data (SIMD)/vectorized instructions on ARM/Neon and Hexagon. The systems and methods disclosed herein may be widely applicable. Generally speaking, the number of operations may be reduced from 3*m*n to n*(2*min(m, n)+1). In some configurations, the approach for LBP described herein may be applied to LBP-based face detection (e.g., LBP-based face detection in QFT).

Figure 17:
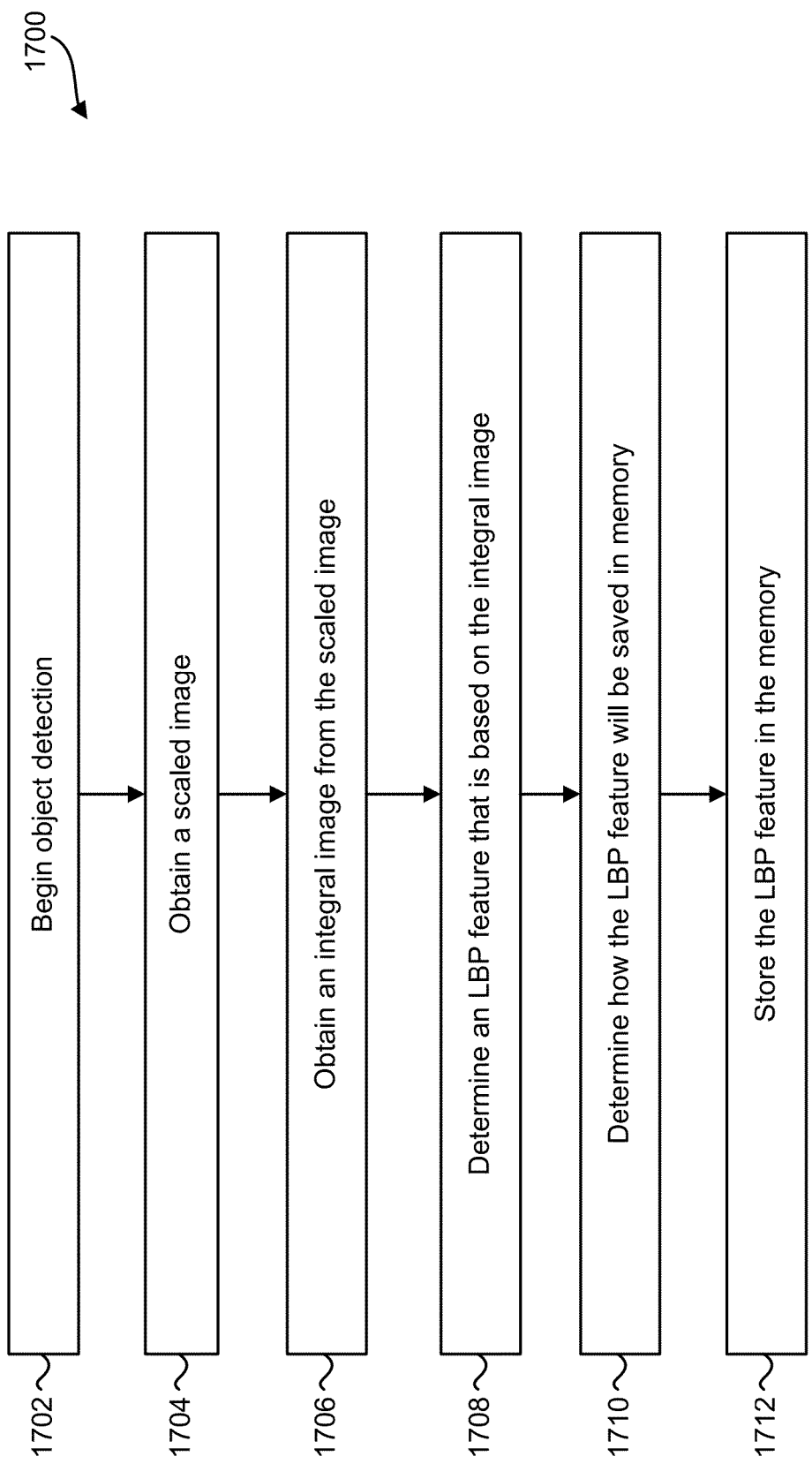
FIG. 17 is a flow diagram illustrating one configuration of a method for efficient representation of LBP features on an integral image.

FIG. 17 is a flow diagram illustrating one configuration of a method 1700 for efficient representation of LBP features on an integral image 218a-n. The method 1700 may be performed by an electronic device 102. The electronic device 102 may begin 1702 object detection. The electronic device 102 may obtain 1704 a scaled image. The electronic device 102 may obtain 1706 an integral image 218a-n from the scaled image 216a-n. The electronic device 102 may then determine 1708 an LBP feature that is based on the integral image 218a-n. In many applications, such as object detection/matching, there may be thousands of LBP features in the pre-trained classifier. The LBP features may each be accessed a large number of times. An LBP feature is typically stored in memory 182 using 16 pointers, leading to intensive memory accesses that can potentially degrade the overall performance due to cache misses and bus traffic. By using alternate methods of storing the LBP features in memory 182, object detection/matching algorithms may experience accelerated performance.

Rather than using 16 pointers (64 bytes) to represent each LBP feature, three alternate ways to represent an LBP feature are described. In one configuration, each LBP feature may be stored using one pointer, the width of each rectangle and the height of each rectangle in the integral image. In this configuration, the LBP feature may be stored using 12 bytes. In another configuration, each LBP feature may be stored using two pointers and the width of each rectangle in the integral image. In this configuration, the LBP feature may be stored using 12 bytes. In yet another configuration, each LBP feature may be stored using four pointers and the width of each rectangle in the integral image. In this configuration, the LBP feature may be stored using 20 bytes. The electronic device 102 may determine 1710 how the LBP feature will be saved in memory 182 (e.g., one pointer, the height and width, two pointers and the width or four pointers and the width). The electronic device 102 may then store 1712 the LBP feature in the memory 182. In one configuration, the electronic device 102 may store the LBP feature in the memory 182 using at least one pointer and a width of a rectangle used in the LBP feature.

Figure 18:
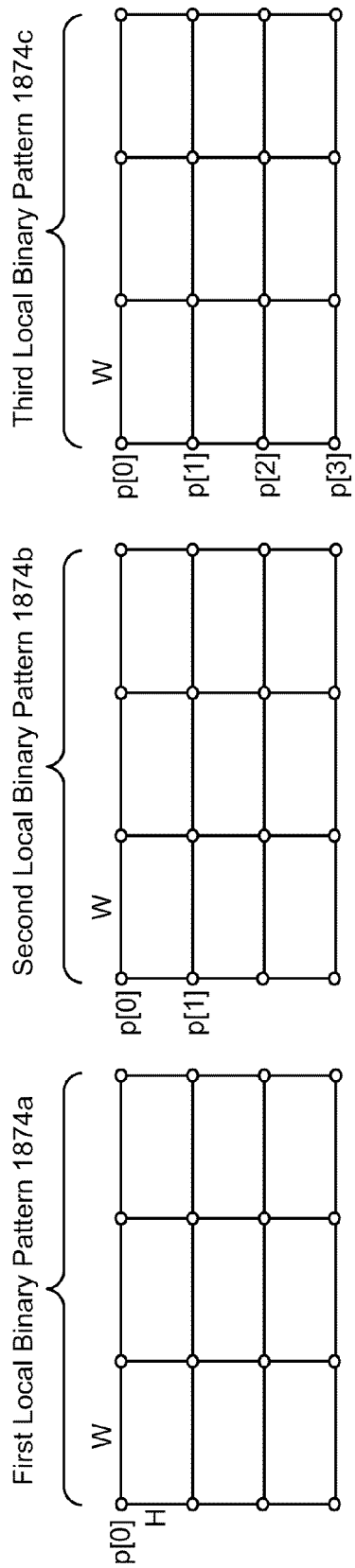
FIG. 18 illustrates the different memory representations used to store an LBP in memory.

FIG. 18 illustrates the different memory representations used to store an LBP 1874a-c in memory 182. The first LBP feature 1874a can be stored using one pointer (p[0]), the width W of each rectangle and the height H of each rectangle in the LBP feature 1874a. The LBP feature 1874a may then be calculated as needed. For example, the pointer p[1] may be calculated using p[0]+H, the pointer p[2]=p[1]+H, the pointer p[3]=p[2]+H, etc.

The second LBP feature 1874b can be stored using two pointers (p[0] and p[1]) and the width W of each rectangle in the LBP feature 1874b. The LBP feature 1874b may then be calculated as needed. For example, the pointer p[2]=p[1]+(p[1]−p[0]) (e.g., p[2]=2*p[1]−p[0] (without using height H)) and the pointer p[4]=p[0]+W.

The third LBP feature 1874c can be stored using four pointers (p[0], p[1], p[2] and p[3]) and the width W of each rectangle in the LBP feature 1874c. The LBP feature 1874c may then be calculated as needed. For example, the pointer p[4]=p[0]+W and the pointer p[5]=p[1]+W.

In general, using different memory representations to store an LBP feature 1874a-c in memory 182 can be used to store m*n LBP-like features with the memory 182 reduced from 4*(m+1)*(n+1) bytes to either 12 bytes or 20 bytes, depending on the memory representation used. An object detection algorithm may then compute the feature locations on the fly rather than by direct memory access.

One example of calculating an LBP with a one pointer representation is given as follows. p[1]=p[0]+H; p[2]=p[1]+H; p[3]=p[2]+H; p[4]=p[0]+W; p[5]=p[4]+H; p[6]=p[5]+H; p[7]=p[6]+H; p[8]=p[4]+W; p[9]=p[8]+H; p[10]=p[9]+H; p[11]=p[10]+H; p[12]=p[8]+W; p[13]=p[12]+H; p[14]=p[13]+H; p[15]=p[14]+H.

One example of calculating an LBP with a two pointers representation is given as follows. p[2]=p[1]+H; p[3]=p[2]+H; p[4]=p[0]+W; p[5]=p[4]+H; p[6]=p[5]+H; p[7]=p[6]+H; p[8]=p[4]+W; p[9]=p[8]+H; p[10]=p[9]+H; p[11]=p[10]+H; p[12]=p[8]+W; p[13]=p[12]+H; p[14]=p[13]+H; p[15]=p[14]+H.

One example of calculating an LBP with a four pointers representation is given as follows. p[4]=p[0]+W; p[5]=p[1]+W; p[6]=p[2]+W; p[7]=p[3]+W; p[8]=p[4]+W; p[9]=p[5]+W; p[10]=p[6]+W; p[11]=p[7]+W; p[12]=p[8]+W; p[13]=p[9]+W; p[14]=p[10]+W; p[15]=p[11]+W.

Figure 19:
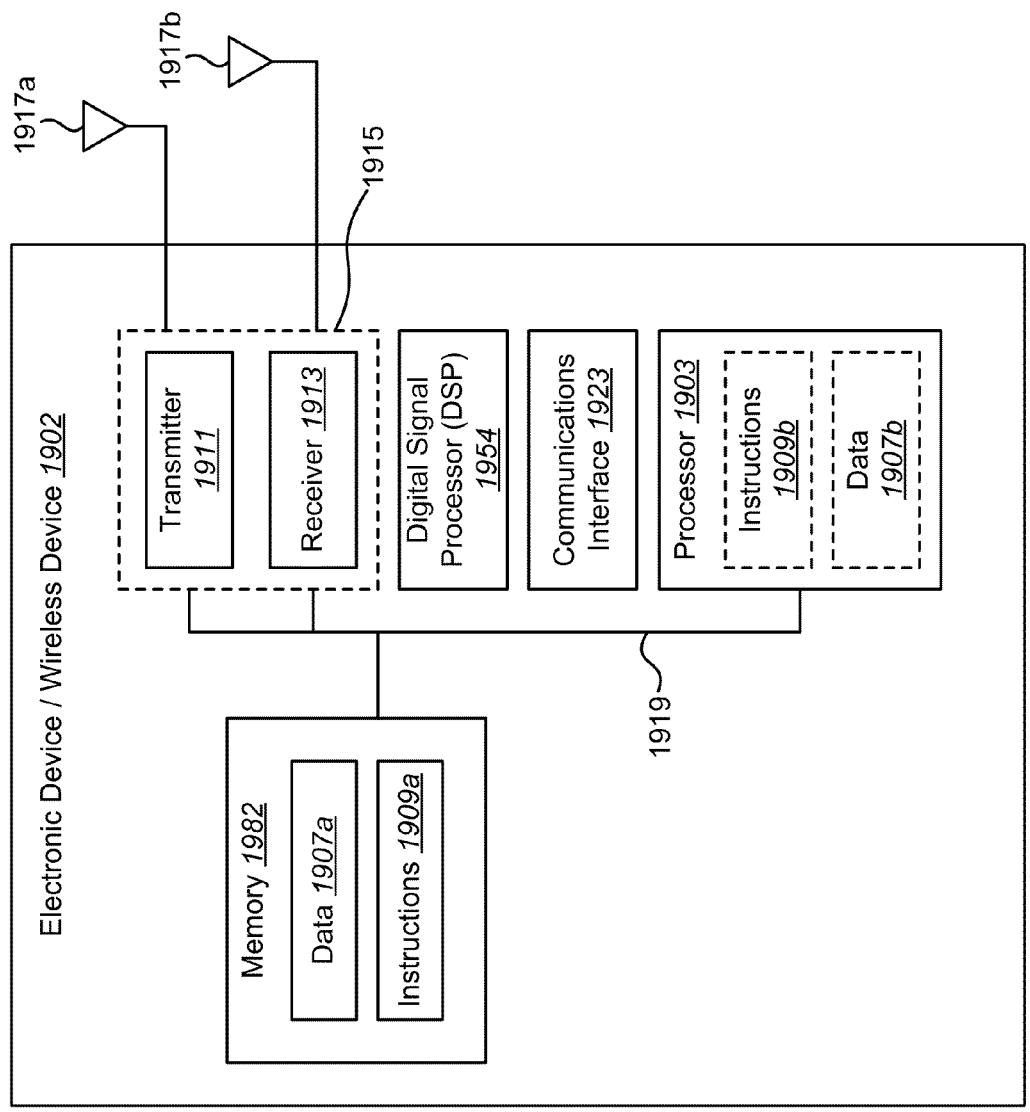
FIG. 19 illustrates certain components that may be included within an electronic device/wireless device.

FIG. 19 illustrates certain components that may be included within an electronic device/wireless device 1902. Examples of the electronic device/wireless device 1902 include an access terminal, a mobile station, a user equipment (UE), a base station, an access point, a broadcast transmitter, a node B, an evolved node B, a computer (e.g., desktop computer, laptop computer), tablet device, smart phone, television, gaming console, digital camera, digital camcorder, etc., such as the electronic device 102 illustrated in FIG. 1. The electronic device/wireless device 1902 includes a processor 1903. The processor 1903 may be a general purpose single- or multi-chip microprocessor (e.g., an ARM), a special purpose microprocessor (e.g., a digital signal processor (DSP)), a microcontroller, a programmable gate array, etc. The processor 1903 may be referred to as a central processing unit (CPU). Although just a single processor 1903 is shown in the electronic device/wireless device, in an alternative configuration, a combination of processors (e.g., an ARM and DSP) could be used.

The electronic device/wireless device 1902 also includes memory 1982. The memory 1982 may be any electronic component capable of storing electronic information. The memory 1982 may be embodied as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 1907a and instructions 1909a may be stored in the memory 1982. The instructions 1909a may be executable by the processor 1903 to implement the methods disclosed herein. Executing the instructions 1909a may involve the use of the data 1907a that is stored in the memory 1982. When the processor 1903 executes the instructions 1909a, various portions of the instructions 1909b may be loaded onto the processor 1903, and various pieces of data 1907b may be loaded onto the processor 1903.

The electronic device/wireless device 1902 may also include a transmitter 1911 and a receiver 1913 to allow transmission and reception of signals to and from the electronic device/wireless device 1902. The transmitter and receiver may be collectively referred to as a transceiver 1915. Multiple antennas 1917a-b may be electrically coupled to the transceiver 1915. The electronic device/wireless device 1902 may also include (not shown) multiple transmitters, multiple receivers, multiple transceivers and/or additional antennas.

The electronic device/wireless device 1902 may include a digital signal processor (DSP) 1954. The electronic device/wireless device 1902 may also include a communications interface 1923. The communications interface 1923 may allow a user to interact with the electronic device/wireless device 1902.

The various components of the electronic device/wireless device 1902 may be coupled together by one or more buses 1919, which may include a power bus, a control signal bus, a status signal bus, a data bus, etc. For the sake of clarity, the various buses are illustrated in FIG. 19 as a bus system 1919.

In accordance with the present disclosure, a circuit, in an electronic device, may be adapted to transfer a first portion of a first decision tree and a second portion of a second decision tree from a first memory to cache memory. The first portion and second portion of each decision tree may be stored contiguously in the first memory. Additionally or alternatively, the first decision tree and the second decision tree may each be associated with a different feature of an object detection algorithm. The same circuit, a different circuit, or a second section of the same or different circuit may be adapted to traverse the first portion of the first decision tree and the second portion of the second decision tree in the cache memory based on the order of execution of the object detection algorithm. The second section may advantageously be coupled to the first section, or it may be embodied in the same circuit as the first section. In addition, the same circuit, a different circuit or a third section of the same or different circuit may be adapted to control the configuration of the circuit(s) or section(s) of circuit(s) that provide the functionality described above.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server or other remote source using a coaxial cable, fiber optic cable, twisted pair, digital subscriber line (DSL) or wireless technologies such as infrared, radio and microwave, then the coaxial cable, fiber optic cable, twisted pair, DSL or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by one or more of FIGS. 1-7 and 9-19, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. A method for memory utilization by an electronic device, comprising:
   transferring a first portion of a first decision tree and a second portion of a second decision tree from a first memory to a cache memory, wherein the first portion and second portion of each decision tree are stored contiguously in the first memory, wherein the first decision tree and second decision tree are each associated with a different feature of an object detection algorithm; and
   traversing the first portion of the first decision tree and the second portion of the second decision tree in the cache memory based on an order of execution of the object detection algorithm.

2. The method of claim 1, wherein reducing cache misses results in lower latency for processing the object detection algorithm compared to when the first portion and second portions are not contiguously arranged in the first memory.

3. The method of claim 1, wherein reducing cache misses results in less power consumption for processing the object detection algorithm compared to when the first portion and second portions are not contiguously arranged in the first memory.

4. The method of claim 1, further comprising:
   loading frequently grouped portions of decision trees together to fit in a fixed memory size; and
   accessing the frequently grouped portions of the decision trees based on the order of execution of the object detection algorithm.

5. The method of claim 4, wherein a feature in the object detection algorithm comprises a local binary pattern (LBP) feature.

6. The method of claim 1, further comprising:
   determining a feature based on an integral image;
   determining how the feature will be saved in memory; and
   storing the feature in the memory using at least one pointer and a width of a rectangle used in the feature.

7. The method of claim 6, wherein the feature is stored in memory using two pointers and the width of the rectangle used in the feature.

8. The method of claim 6, wherein the feature is stored in memory using one pointer, the width of each rectangle used in the feature and a height of each rectangle used in the feature.

9. The method of claim 6, wherein the feature is stored in memory using four pointers and the width of the rectangle used in the feature.

10. The method of claim 6, wherein the feature comprises a Haar feature.

11. An electronic device for memory utilization, comprising:
    a processor;
    memory in electronic communication with the processor; and
    instructions stored in the memory, the instructions being executable by the processor to:
       transfer a first portion of a first decision tree and a second portion of a second decision tree from a first memory to a cache memory, wherein the first portion and second portion of each decision tree are stored contiguously in the first memory, wherein the first decision tree and second decision tree are each associated with a different feature of an object detection algorithm; and
       traverse the first portion of the first decision tree and the second portion of the second decision tree in the cache memory based on an order of execution of the object detection algorithm.

12. The electronic device of claim 11, wherein reducing cache misses results in lower latency for processing the object detection algorithm compared to when the first portion and second portions are not contiguously arranged in the first memory.

13. The electronic device of claim 11, wherein reducing cache misses results in less power consumption for processing the object detection algorithm compared to when the first portion and second portions are not contiguously arranged in the first memory.

14. The electronic device of claim 11, further comprising:
    loading frequently grouped portions of decision trees together to fit in a fixed memory size; and
    accessing the frequently grouped portions of the decision trees based on the order of execution of the object detection algorithm.

15. The electronic device of claim 14, wherein a feature in the object detection algorithm comprises a local binary pattern (LBP) feature.

16. The electronic device of claim 11, further comprising:
    determining a feature based on an integral image;
    determining how the feature will be saved in memory; and
    storing the feature in the memory using at least one pointer and a width of a rectangle used in the feature.

17. The electronic device of claim 16, wherein the feature is stored in memory using two pointers and the width of the rectangle used in the feature.

18. The electronic device of claim 16, wherein the feature is stored in memory using one pointer, the width of each rectangle used in the feature and a height of each rectangle used in the feature.

19. The electronic device of claim 16, wherein the feature is stored in memory using four pointers and the width of the rectangle used in the feature.

20. The electronic device of claim 16, wherein the feature comprises a Haar feature.

21. An apparatus for memory utilization, comprising:
   means for transferring a first portion of a first decision tree and a second portion of a second decision tree from a first memory to a cache memory, wherein the first portion and second portion of each decision tree are stored contiguously in the first memory, wherein the first decision tree and second decision tree are each associated with a different feature of an object detection algorithm; and
   means for traversing the first portion of the first decision tree and the second portion of the second decision tree in the cache memory based on an order of execution of the object detection algorithm.

22. The apparatus of claim 21, wherein reducing cache misses results in lower latency for processing the object detection algorithm compared to when the first portion and second portions are not contiguously arranged in the first memory.

23. The apparatus of claim 21, wherein reducing cache misses results in less power consumption for processing the object detection algorithm compared to when the first portion and second portions are not contiguously arranged in the first memory.

24. The apparatus of claim 21, further comprising:
   means for loading frequently grouped portions of decision trees together to fit in a fixed memory size; and
   means for accessing the frequently grouped portions of the decision trees based on the order of execution of the object detection algorithm.

25. The apparatus of claim 21, further comprising:
   means for determining a feature based on an integral image;
   means for determining how the feature will be saved in memory; and
   means for storing the feature in the memory using at least one pointer and a width of a rectangle used in the feature.

26. A non-transitory tangible computer-readable medium having instructions thereon, the instructions comprising:
   code for causing an electronic device to transfer a first portion of a first decision tree and a second portion of a second decision tree from a first memory to a cache memory, wherein the first portion and second portion of each decision tree are stored contiguously in the first memory, and wherein the first decision tree and second decision tree are each associated with a different feature of an object detection algorithm; and
   code for causing the electronic device to traverse the first portion of the first decision tree and the second portion of the second decision tree in the cache memory based on an order of execution of the object detection algorithm.

27. The computer-readable medium of claim 26, wherein reducing cache misses results in lower latency for processing the object detection algorithm compared to when the first portion and second portions are not contiguously arranged in the first memory.

28. The computer-readable medium of claim 26, wherein reducing cache misses results in less power consumption for processing the object detection algorithm compared to when the first portion and second portions are not contiguously arranged in the first memory.

29. The computer-readable medium of claim 26, further comprising:
   code for causing the electronic device to load frequently grouped portions of decision trees together to fit in a fixed memory size; and
   code for causing the electronic device to access the frequently grouped portions of the decision trees based on the order of execution of the object detection algorithm.

30. The computer-readable medium of claim 26, further comprising:
   code for causing the electronic device to determine a feature based on an integral image;
   code for causing the electronic device to determine how the feature will be saved in memory; and
   code for causing the electronic device to store the feature in the memory using at least one pointer and a width of a rectangle used in the feature.

* * * * *